US011797907B2

(12) United States Patent
Strang et al.

(10) Patent No.: US 11,797,907 B2
(45) Date of Patent: Oct. 24, 2023

(54) SYSTEMS, METHODS, AND COMPUTER PROGRAM PRODUCTS FOR CONSOLIDATED IDENTIFICATION AND ENGAGEMENT OF ON-DEMAND PACKAGING CUSTOMERS

(71) Applicant: United Parcel Service of America, Inc., Atlanta, GA (US)

(72) Inventors: Randolph George Strang, Milton, GA (US); Jeffrey Allen Battaglia, Milton, GA (US); Eilert John Bonk, East Syracuse, NY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 594 days.

(21) Appl. No.: 16/750,365

(22) Filed: Jan. 23, 2020

(65) Prior Publication Data

US 2020/0160257 A1    May 21, 2020

Related U.S. Application Data

(63) Continuation of application No. 14/280,226, filed on May 16, 2014, now Pat. No. 10,546,264.

(51) Int. Cl.
*G06Q 10/083* (2023.01)
*G06F 16/951* (2019.01)

(52) U.S. Cl.
CPC ......... *G06Q 10/083* (2013.01); *G06F 16/951* (2019.01)

(58) Field of Classification Search
CPC ................. G06Q 10/083; G06F 16/951
See application file for complete search history.

(56) References Cited

U.S. PATENT DOCUMENTS 7,016,859 B2 * 3/2006 Whitesage ......... G06Q 10/0639
705/7.31
7,051,364 B1 * 5/2006 Tackman ............. H04L 9/3247
726/3

(Continued)

FOREIGN PATENT DOCUMENTS

WO    WO-0025246 A1 *  5/2000  ............. G06F 21/64

OTHER PUBLICATIONS

Olsson "Packaging, Containers for Industrial Materials", published by Wiley Online Library, on Jun. 17, 2005 (Year: 2005).*

(Continued)

*Primary Examiner* — Omar Zeroual
(74) *Attorney, Agent, or Firm* — SHOOK, HARDY & BACON L.L.P.

(57) ABSTRACT

Various embodiments provide systems, methods, and computer program products for dynamically identifying and engaging at least one on-demand packaging customer in a consolidated fashion. The system comprises one or more computer processors configured to: receive qualification data associated with at least one customer; calculate whether the at least one customer is a qualified customer; in response to identifying the qualified customer, determine whether the qualified customer is a targeted customer; in response to identifying the targeted customer, evaluate a readiness of at least one facility operated by the targeted customer for engagement of an on-demand packaging configuration; in response to determining a positive facility readiness, generate one or more documents for execution by at least the targeted customer, the carrier, and the supplier; and upon execution of the one or more documents, facilitate implementation of the on-demand packaging configuration at the at least one facility.

18 Claims, 12 Drawing Sheets

(56) References Cited

U.S. PATENT DOCUMENTS

| | | | |
|---|---|---|---|
| 7,069,273 B2* | 6/2006 | Grant | G06Q 10/06 |
| 7,085,687 B2* | 8/2006 | Eckenwiler | G05B 19/41885 |
| | | | 53/472 |
| 8,275,583 B2 | 9/2012 | Devarajan et al. | |
| 8,340,813 B2 | 12/2012 | Brown | |
| 8,401,975 B1 | 3/2013 | Tian et al. | |
| 8,438,088 B2* | 5/2013 | Cunniff | G06Q 40/00 |
| | | | 705/40 |
| 2002/0007353 A1* | 1/2002 | Kornacki | G06Q 10/04 |
| | | | 705/400 |
| 2002/0019759 A1* | 2/2002 | Arunapuram | G06Q 30/04 |
| | | | 705/7.26 |
| 2002/0035507 A1* | 3/2002 | Singh | G06Q 30/0277 |
| | | | 705/14.46 |
| 2002/0129056 A1* | 9/2002 | Conant | G06Q 30/06 |
| | | | 715/255 |
| 2003/0040997 A1* | 2/2003 | Rousseau | G06Q 40/00 |
| | | | 705/35 |
| 2003/0046133 A1* | 3/2003 | Morley | G06Q 10/0631 |
| | | | 705/7.38 |
| 2003/0158791 A1* | 8/2003 | Gilberto | G06Q 10/08 |
| | | | 705/26.81 |
| 2003/0182222 A1* | 9/2003 | Rotman | G06Q 40/00 |
| | | | 705/37 |
| 2003/0200111 A1* | 10/2003 | Damji | G06Q 10/08345 |
| | | | 705/335 |
| 2004/0089482 A1* | 5/2004 | Ramsden | G07F 17/26 |
| | | | 177/1 |
| 2004/0260587 A1* | 12/2004 | Vanduyne | G06Q 10/0832 |
| | | | 705/332 |
| 2004/0260615 A1* | 12/2004 | Phillips | G06Q 10/083 |
| | | | 705/26.44 |
| 2005/0071244 A1* | 3/2005 | Phillips | G06Q 10/0833 |
| | | | 705/26.41 |
| 2005/0160278 A1* | 7/2005 | Farquharson | G06Q 50/18 |
| | | | 713/189 |
| 2006/0271387 A1* | 11/2006 | Gruger | G06Q 10/08 |
| | | | 705/26.1 |
| 2007/0038524 A1* | 2/2007 | Fiechter | G06Q 30/0641 |
| | | | 705/26.81 |
| 2007/0198279 A1* | 8/2007 | Hallas | G06Q 10/08 |
| | | | 705/334 |
| 2007/0288311 A1* | 12/2007 | Underhill | G06Q 30/0226 |
| | | | 705/14.27 |
| 2007/0299686 A1* | 12/2007 | Hu | G06Q 10/08 |
| | | | 705/334 |
| 2008/0136356 A1* | 6/2008 | Zampini | H05B 45/20 |
| | | | 315/308 |
| 2008/0162304 A1* | 7/2008 | Ourega | G06Q 30/0619 |
| | | | 705/26.4 |
| 2008/0203090 A1* | 8/2008 | Dickinson | B65D 81/051 |
| | | | 220/1.5 |
| 2008/0209313 A1* | 8/2008 | Gonser | G06F 40/186 |
| | | | 715/255 |
| 2008/0291033 A1* | 11/2008 | Aghassipour | G06Q 50/30 |
| | | | 340/584 |
| 2008/0301009 A1* | 12/2008 | Plaster | G06Q 10/087 |
| | | | 705/28 |
| 2009/0164273 A1* | 6/2009 | Rothman | G06Q 10/08 |
| | | | 705/330 |
| 2010/0036674 A1* | 2/2010 | Johnson | G06Q 50/32 |
| | | | 705/330 |
| 2010/0042511 A1* | 2/2010 | Sundaresan | G06Q 10/10 |
| | | | 726/8 |
| 2010/0082410 A1* | 4/2010 | Baudin | G06Q 30/0201 |
| | | | 705/7.29 |
| 2010/0106565 A1* | 4/2010 | Manesh | G06Q 30/0633 |
| | | | 705/26.1 |
| 2011/0239044 A1* | 9/2011 | Kumar | G06Q 20/4016 |
| | | | 714/15 |
| 2011/0276875 A1* | 11/2011 | McCabe | G06F 40/197 |
| | | | 715/255 |
| 2012/0116823 A1* | 5/2012 | Vasavada | G06Q 40/00 |
| | | | 705/4 |
| 2012/0246090 A1* | 9/2012 | Griffith | G06Q 10/08 |
| | | | 705/330 |
| 2012/0261462 A1* | 10/2012 | Cox | B65D 5/52 |
| | | | 229/103 |
| 2013/0000252 A1* | 1/2013 | Pettersson | B65B 5/024 |
| | | | 348/46 |
| 2013/0013449 A1* | 1/2013 | Sinha | G06Q 30/0609 |
| | | | 705/26.8 |
| 2013/0103607 A1* | 4/2013 | Knipfer | G06Q 10/04 |
| | | | 705/334 |
| 2013/0144763 A1* | 6/2013 | Skyberg | G06Q 50/28 |
| | | | 705/27.1 |
| 2013/0204419 A1 | 8/2013 | Pettersson | |
| 2013/0247519 A1 | 9/2013 | Clark et al. | |
| 2013/0311216 A1* | 11/2013 | Rothley | G06Q 10/08 |
| | | | 705/7.11 |
| 2014/0059981 A1 | 3/2014 | Pettersson | |
| 2014/0067104 A1 | 3/2014 | Osterhout | |
| 2014/0172737 A1* | 6/2014 | Conjepuram | G06Q 10/0834 |
| | | | 705/333 |
| 2014/0379604 A1* | 12/2014 | Bodenhamer | G06Q 10/08345 |
| | | | 705/330 |
| 2015/0046291 A1* | 2/2015 | Archambault | G06V 30/224 |
| | | | 705/26.63 |
| 2015/0073936 A1* | 3/2015 | Peterson | G06Q 30/0282 |
| | | | 705/26.9 |
| 2015/0088588 A1* | 3/2015 | Fainor | G06Q 10/06316 |
| | | | 705/7.26 |
| 2015/0088767 A1* | 3/2015 | Varadarajan | G06Q 10/30 |
| | | | 705/308 |
| 2015/0332207 A1 | 11/2015 | Strang et al. | |
| 2016/0300277 A1* | 10/2016 | Marlowe | G06Q 10/083 |

OTHER PUBLICATIONS

Olsson et al., "Packaging, Containers for Industrial Materials", Kirk-Othmer Encyclopedia of Chemical Technology, Published by Wiley Online Library, Jun. 17, 2005, 8 pages.

* cited by examiner

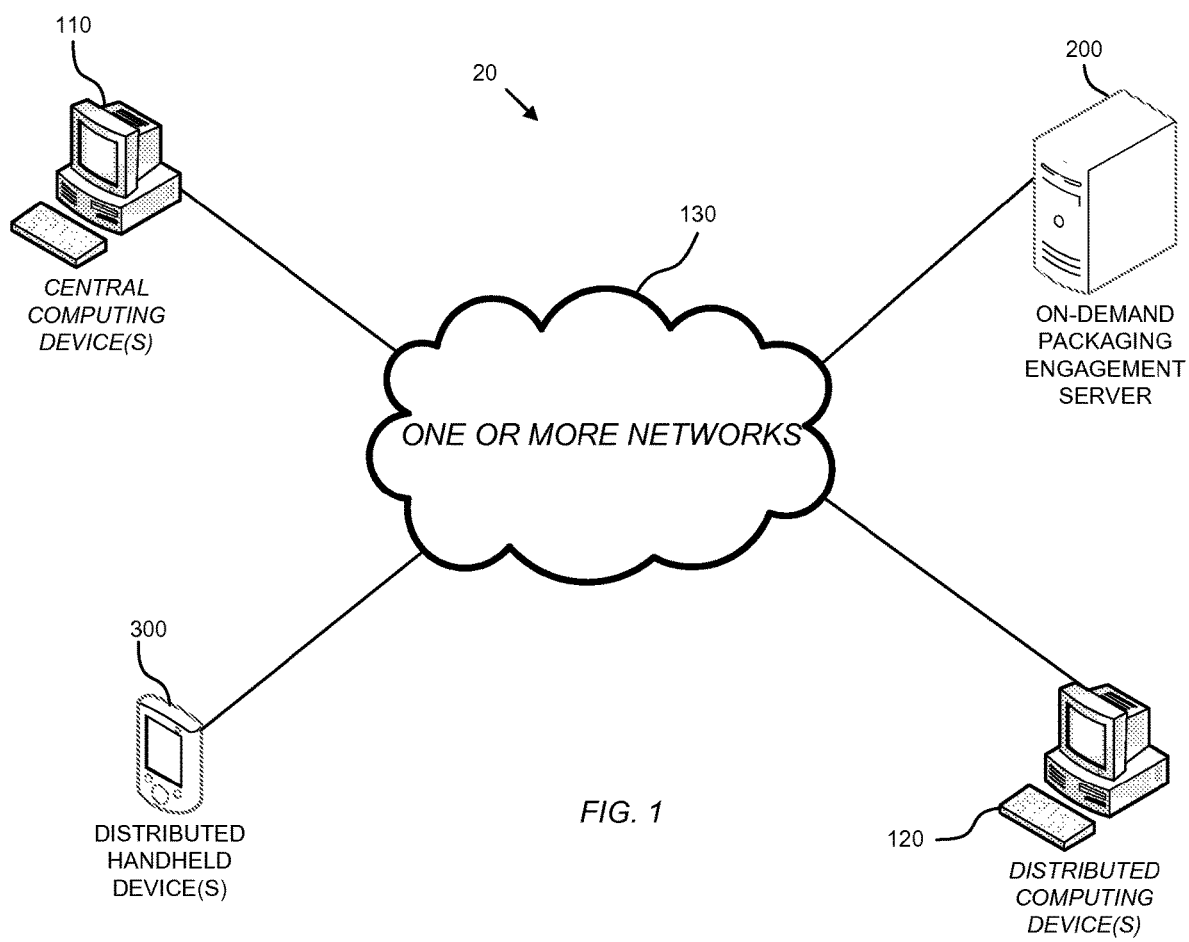

SYSTEMS, METHODS, AND COMPUTER PROGRAM PRODUCTS FOR CONSOLIDATED IDENTIFICATION AND ENGAGEMENT OF ON-DEMAND PACKAGING CUSTOMERS

CROSS-REFERENCE TO RELATED APPLICATIONS

This application is a continuation of U.S. application Ser. No. 14/280,226, filed May 16, 2014, the contents of which are hereby incorporated herein in their entirety by reference.

BACKGROUND

Field of Invention

Various embodiments of the disclosed invention generally relate to systems, methods, and computer program products for identifying and engaging on-demand packaging customers in a consolidated fashion that provides various advantages to one or more entities associated with the transport of a plurality of packages.

Description of Related Art

Across the packaging and package transport industry, common carriers, packaging material providers, shippers (e.g., consignors), and the like regularly transport (or are involved with the preparation for and/or transport of) packages that less than efficiently utilize available packing space within a box, package, or container, collectively referred to hereinafter as a package. While various solutions have been identified that seek to minimize shipping costs, typically by minimizing unused package shipment volume, competing incentives amongst the various entities associated with the shipment and transport process oftentimes result in remaining inefficiencies.

Thus, a need exists for a consolidated process, whereby qualifying on-demand packaging customers may be identified and engaged in a streamlined fashion that also provides a shared value incentive to all involved entities.

BRIEF SUMMARY

According to various embodiments of the present invention, a system for dynamically identifying and engaging at least one on-demand packaging customer in a consolidated fashion so as to provide mutually beneficial advantages to one or more entities associated with the transport of a plurality of packages by the at least one customer is provided. The system comprises: one or more memory storage areas containing at least one or more parameters, customer data associated with at least one customer, carrier data associated with at least one carrier, and supplier data associated with at least one supplier; and one or more computer processors. The one or more computer processors are configured to: receive qualification data associated with the at least one customer; calculate, based at least in part upon the qualification data, the one or more parameters, and the customer data, whether the at least one customer is a qualified customer; in response to identifying the qualified customer, determine, based at least in part upon the carrier data and the supplier data, whether the qualified customer is a targeted customer; in response to identifying the targeted customer, evaluate a readiness of at least one facility operated by the targeted customer for engagement of an on-demand packaging configuration; in response to determining a positive facility readiness, generate one or more documents for execution by at least the targeted customer, the carrier, and the supplier; and upon execution of the one or more documents, facilitate implementation of the on-demand packaging configuration at the at least one facility operated by the targeted customer.

According to various embodiments of the present invention, a computer-implemented method for dynamically identifying and engaging at least one on-demand packaging customer in a consolidated fashion so as to provide mutually beneficial advantages to one or more entities associated with the transport of a plurality of packages by the at least one customer is provided. The method comprises the step of: receiving and storing within one or more memory storage areas at least one or more parameters, customer data and qualification data associated with at least one customer, carrier data associated with at least one carrier, and supplier data associated with at least one supplier; calculating, via at least one computer processor and based at least in part upon the qualification data, the one or more parameters, and the customer data, whether the at least one customer is a qualified customer; in response to identifying the qualified customer, determining, via the at least one computer processor and based at least in part upon the carrier data and the supplier data, whether the qualified customer is a targeted customer; in response to identifying the targeted customer, evaluating, via the at least one computer processor, a readiness of at least one facility operated by the targeted customer for engagement of an on-demand packaging configuration; in response to determining a positive facility readiness, generating, via the at least one computer processor, one or more documents for execution by at least the targeted customer, the carrier, and the supplier; and upon execution of the one or more documents, facilitating implementation of the on-demand packaging configuration at the at least one facility operated by the targeted customer.

According to various embodiments of the present invention, a non-transitory computer program product comprising at least one computer-readable storage medium having computer-readable program code portions embodied therein is provided. The computer-readable program code portions comprise: an executable portion configured for receiving qualification data associated with at least one customer; an executable portion configured for retrieving at least one or more parameters and based at least in part thereon and further upon the qualification data and additional customer data calculating whether the at least one customer is a qualified customer; an executable portion configured for in response to identifying the qualified customer, determining, based at least in part upon carrier data and supplier data, whether the qualified customer is a targeted customer; an executable portion configured for, in response to identifying the targeted customer, evaluating a readiness of at least one facility operated by the targeted customer for engagement of an on-demand packaging configuration; an executable portion configured for, in response to determining a positive facility readiness, generating one or more documents for execution by at least the targeted customer, the carrier, and the supplier; and an executable portion configured for, upon execution of the one or more documents, facilitating implementation of the on-demand packaging configuration at the at least one facility operated by the targeted customer.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

FIG. 1 is a block diagram of a system 20 according to various embodiments;

Figure 2A:
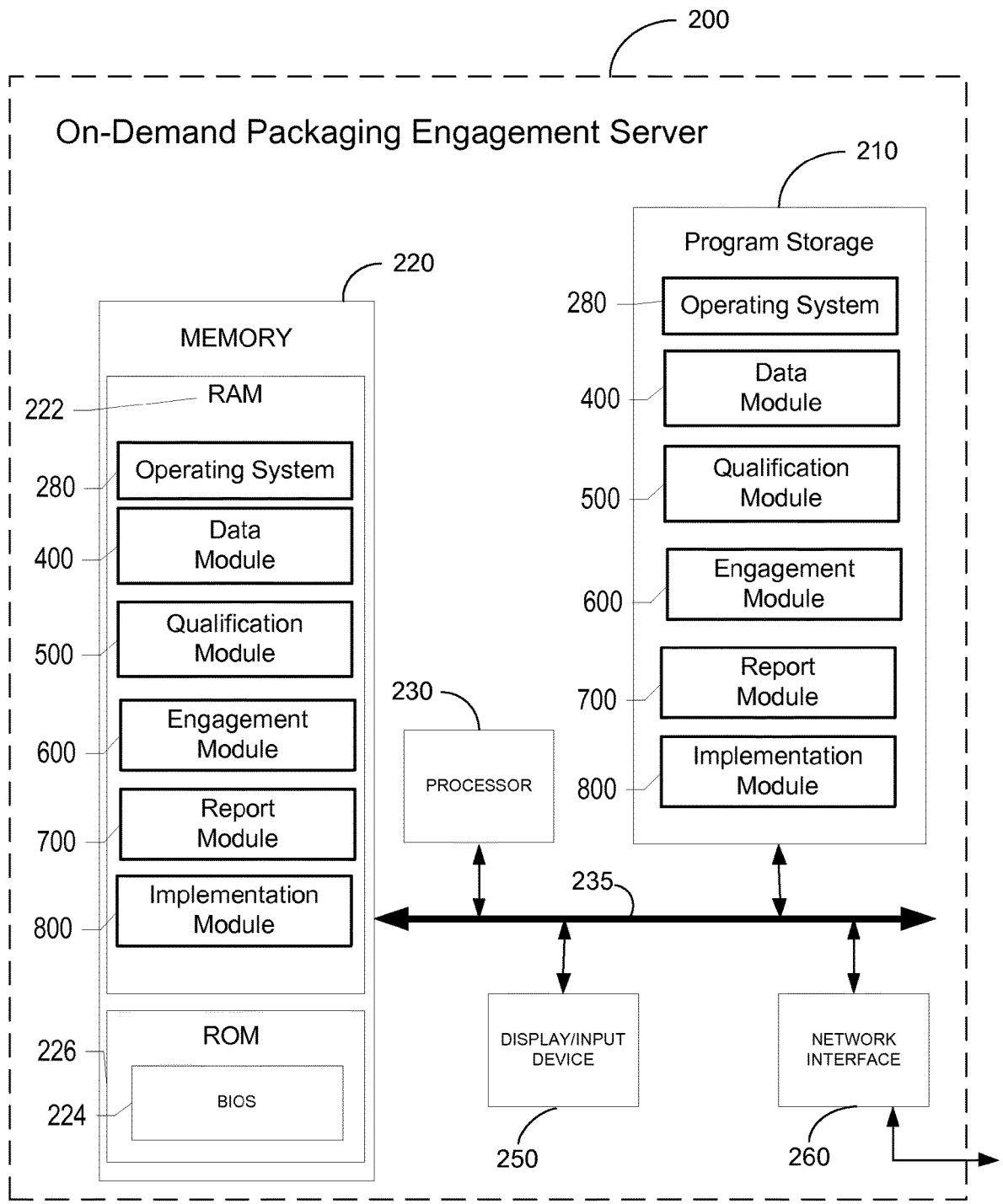
FIG. 2A is schematic block diagram of a server 200 according to various embodiments.
Figure 2B:
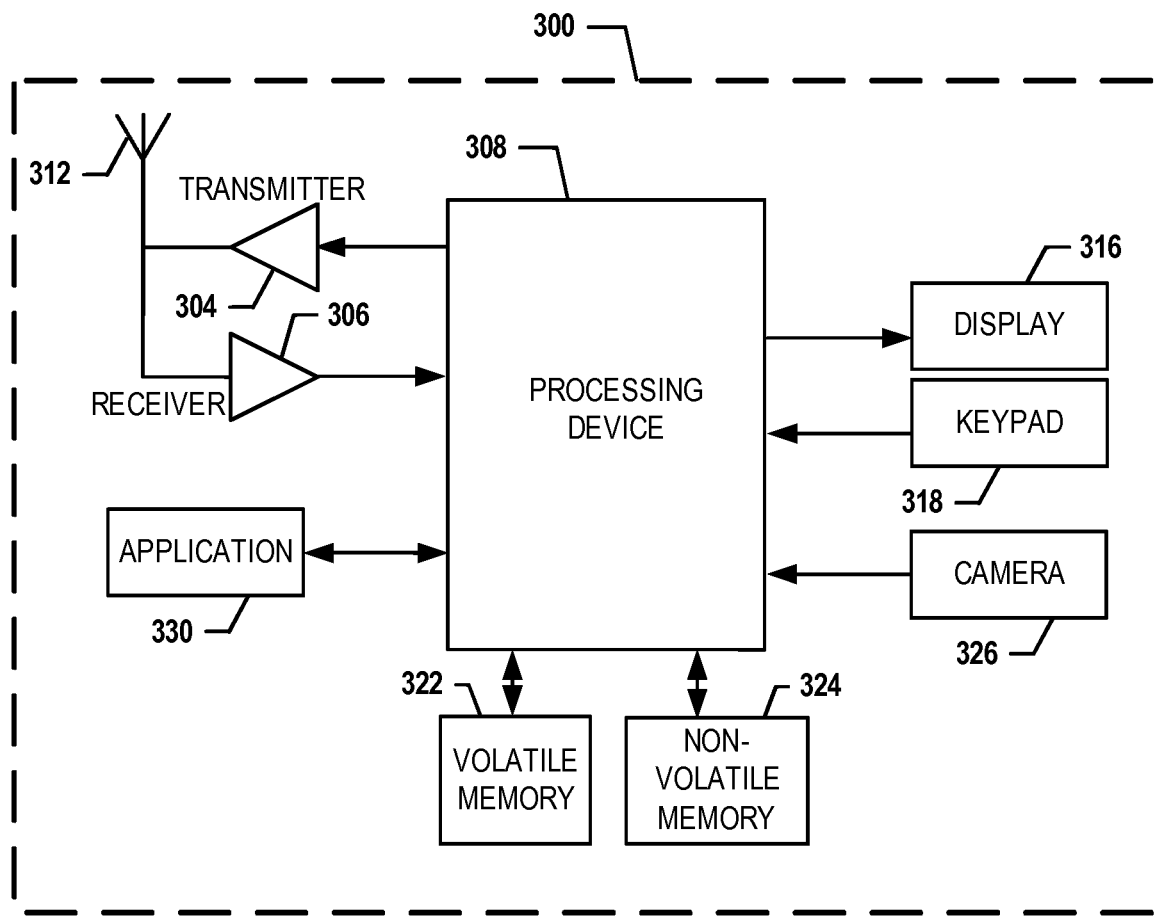
FIG. 2B is schematic block diagram of an exemplary mobile device 300 according to various embodiments.
Figure 3:
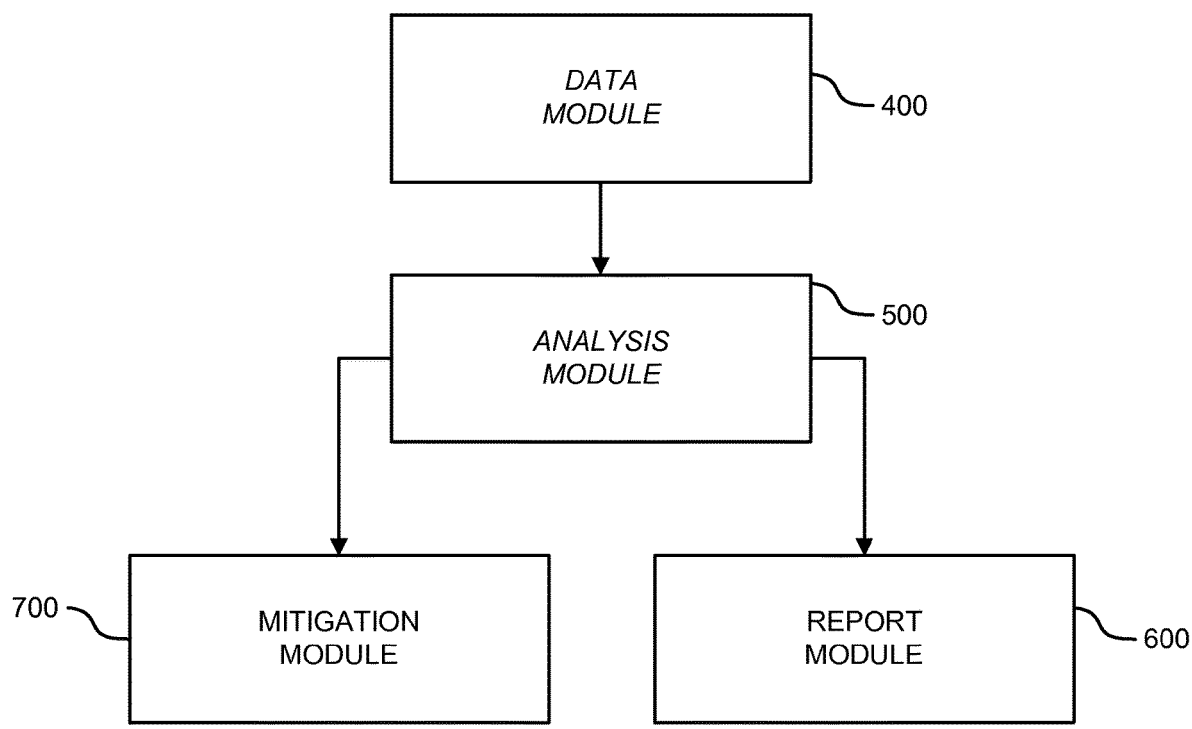
FIG. 3 illustrates an overall process flow for various modules of the server 200 according to various embodiments.
Figure 5:
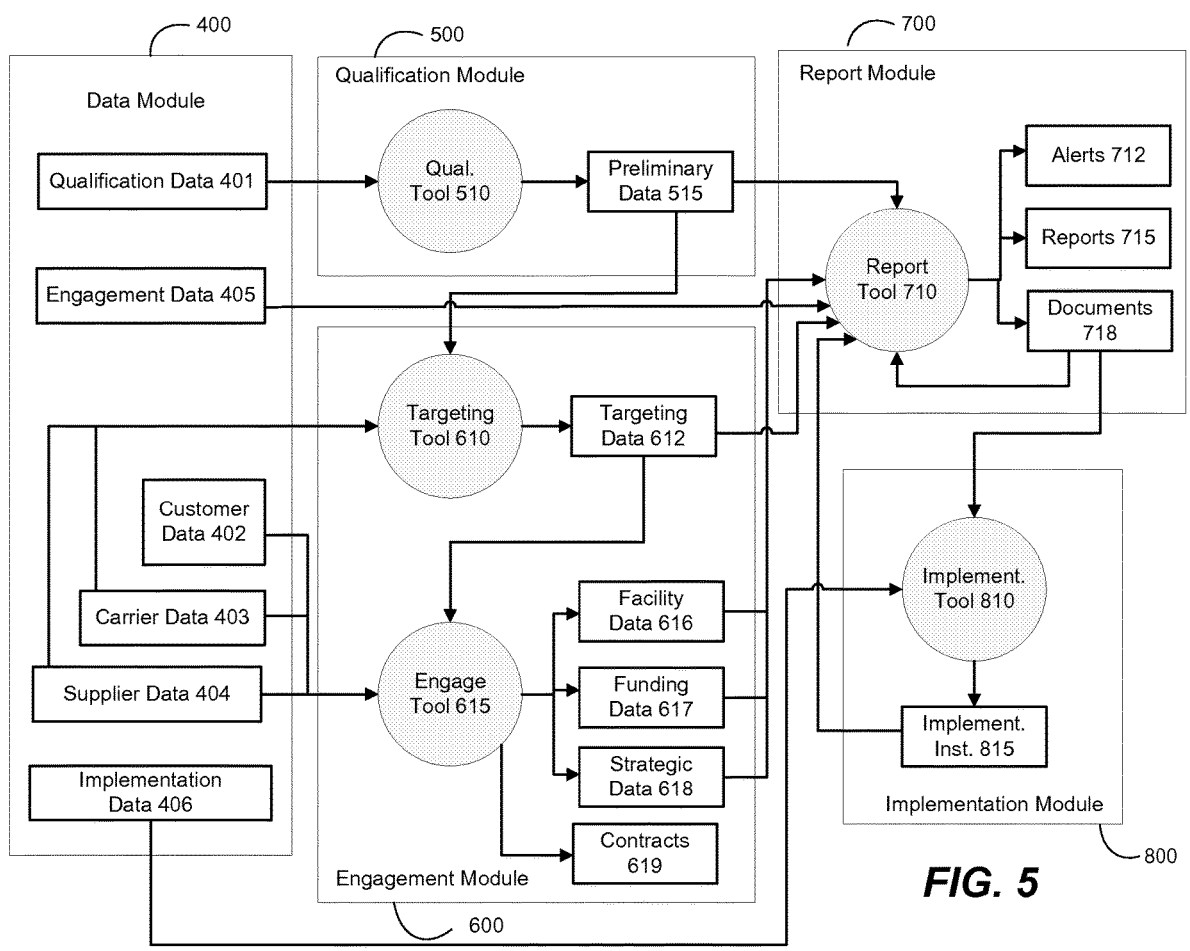
Figure 6:
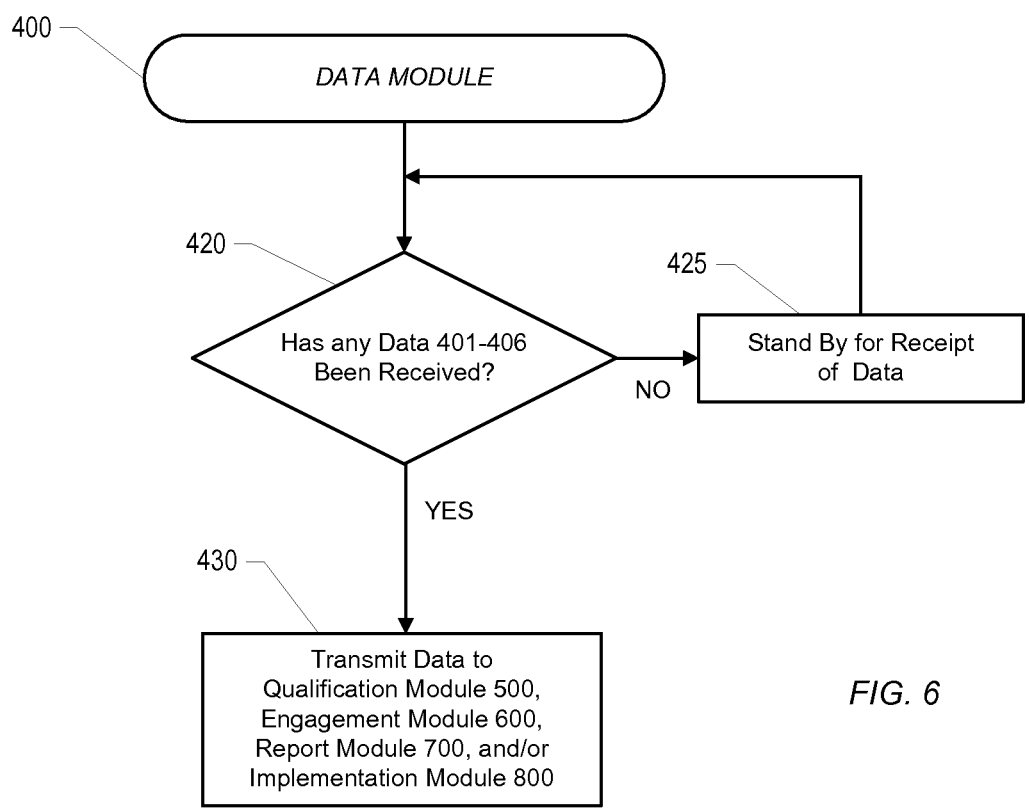
Figure 7:
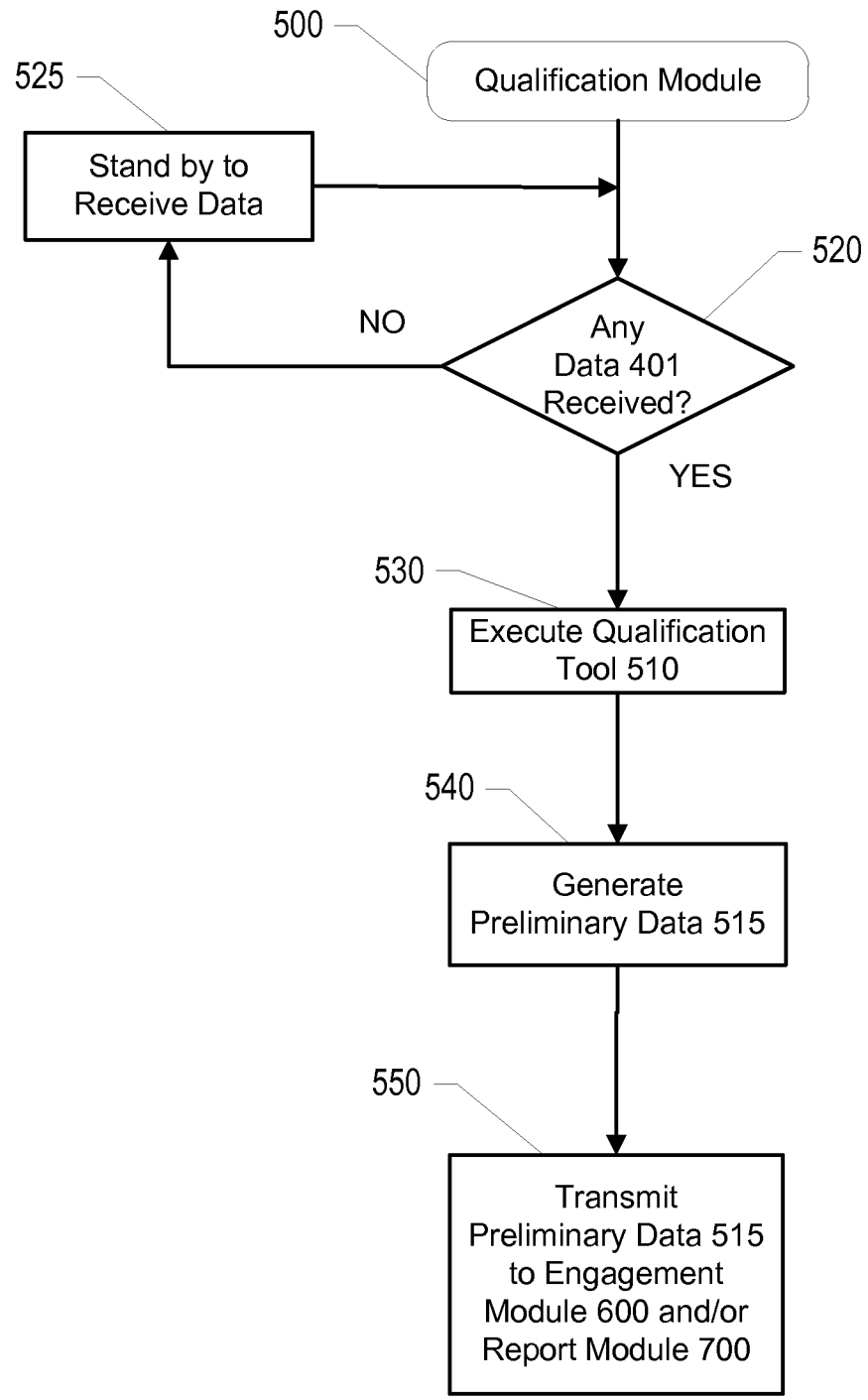
Figure 8:
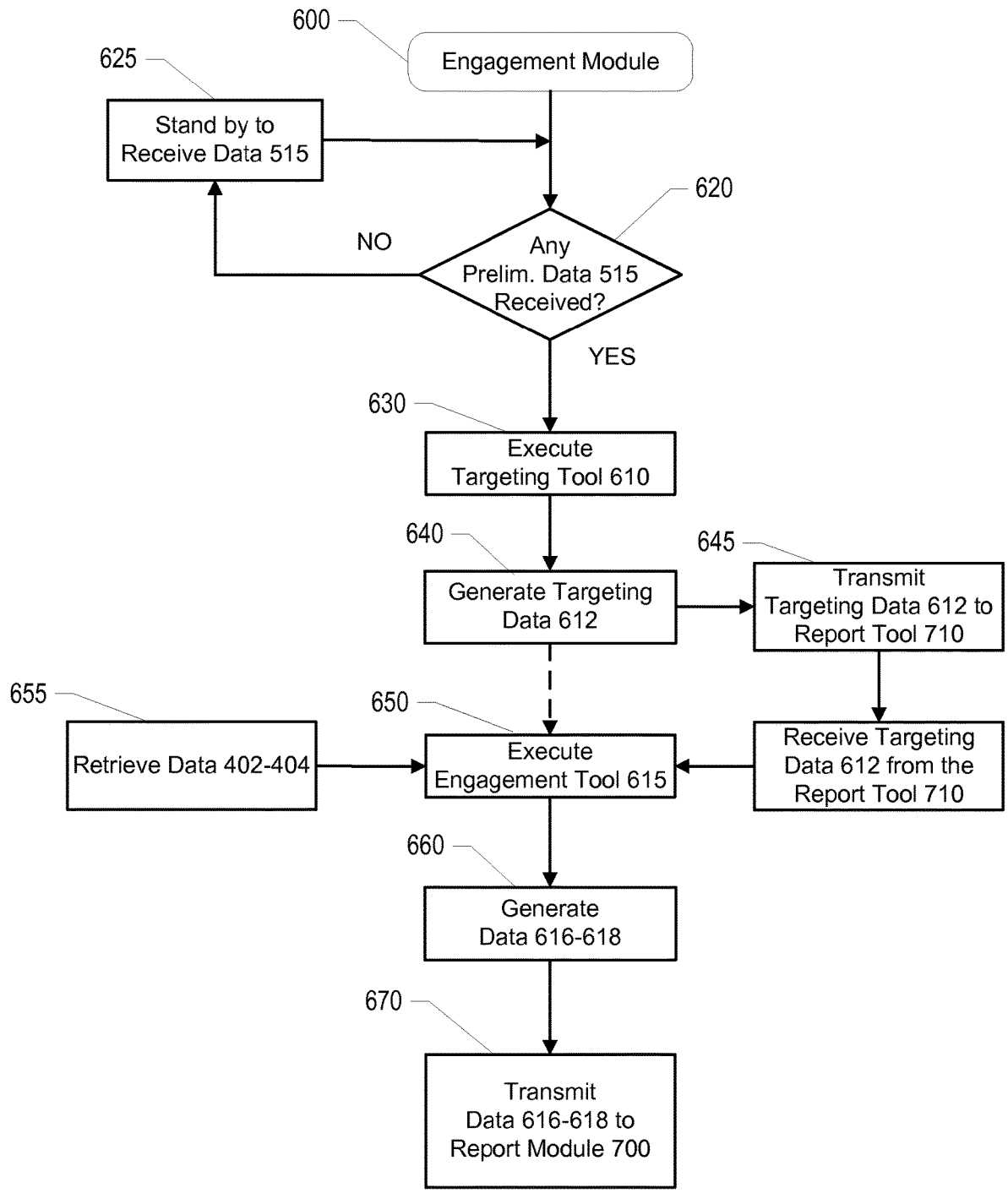
Figure 9:
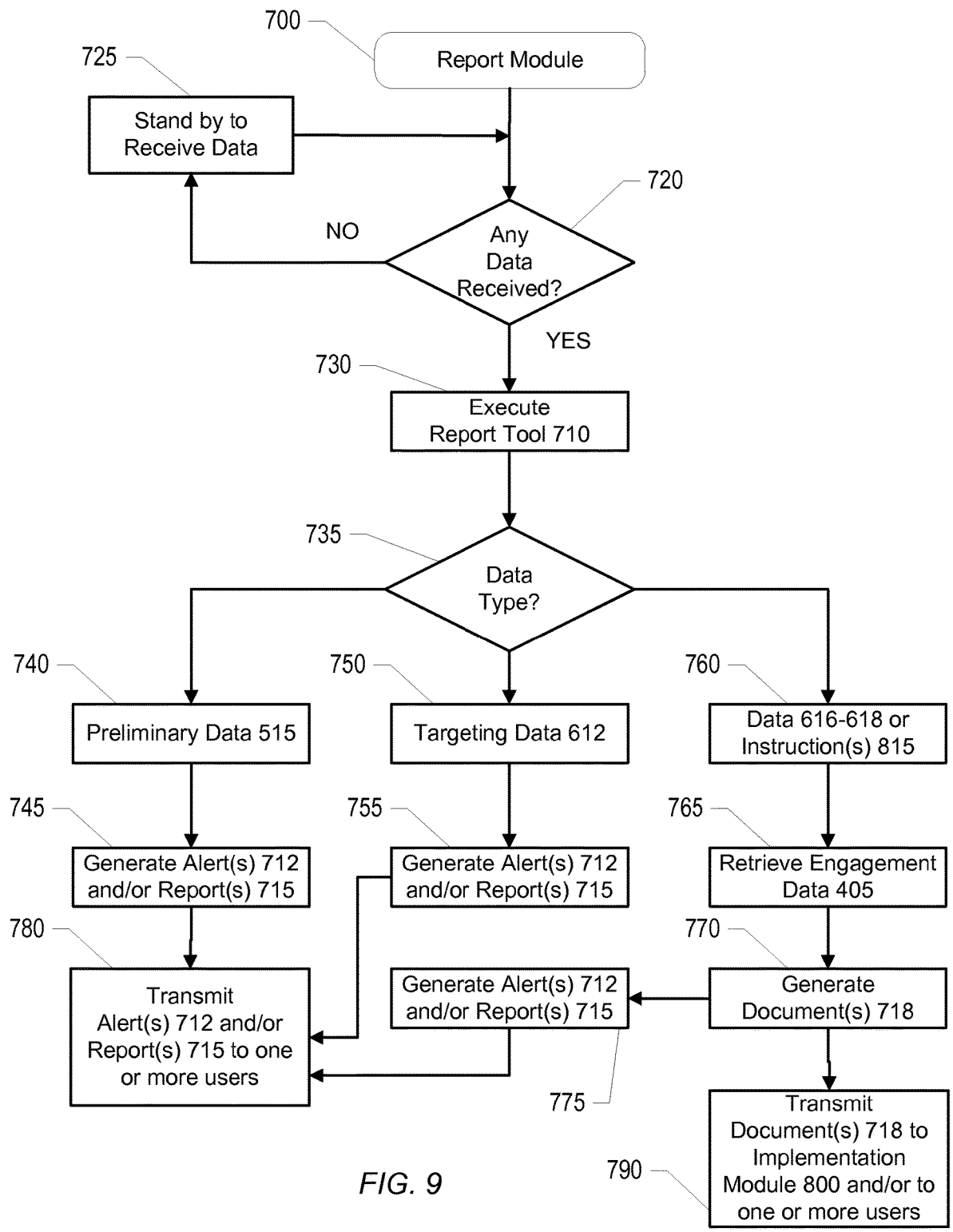
Figure 10:
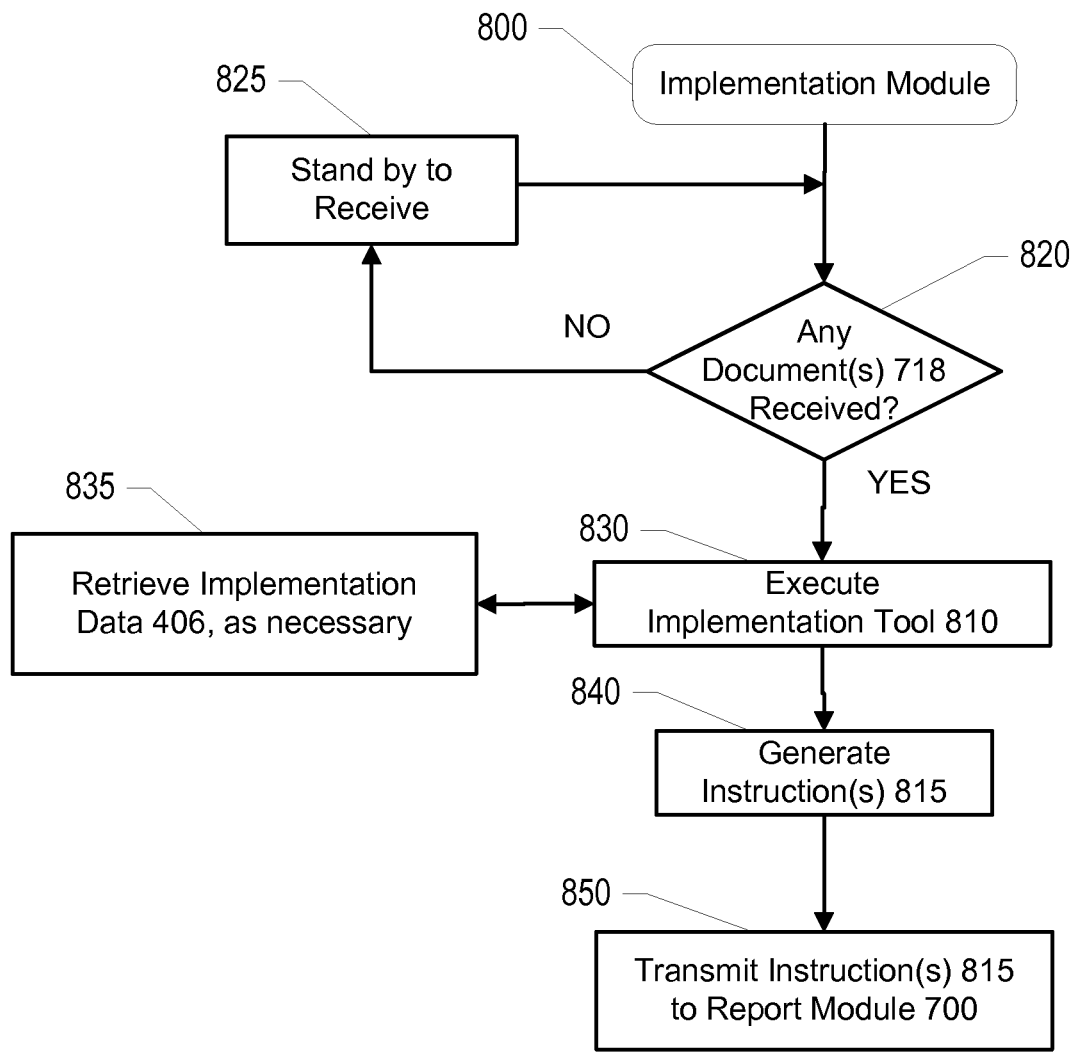
Figure 11:
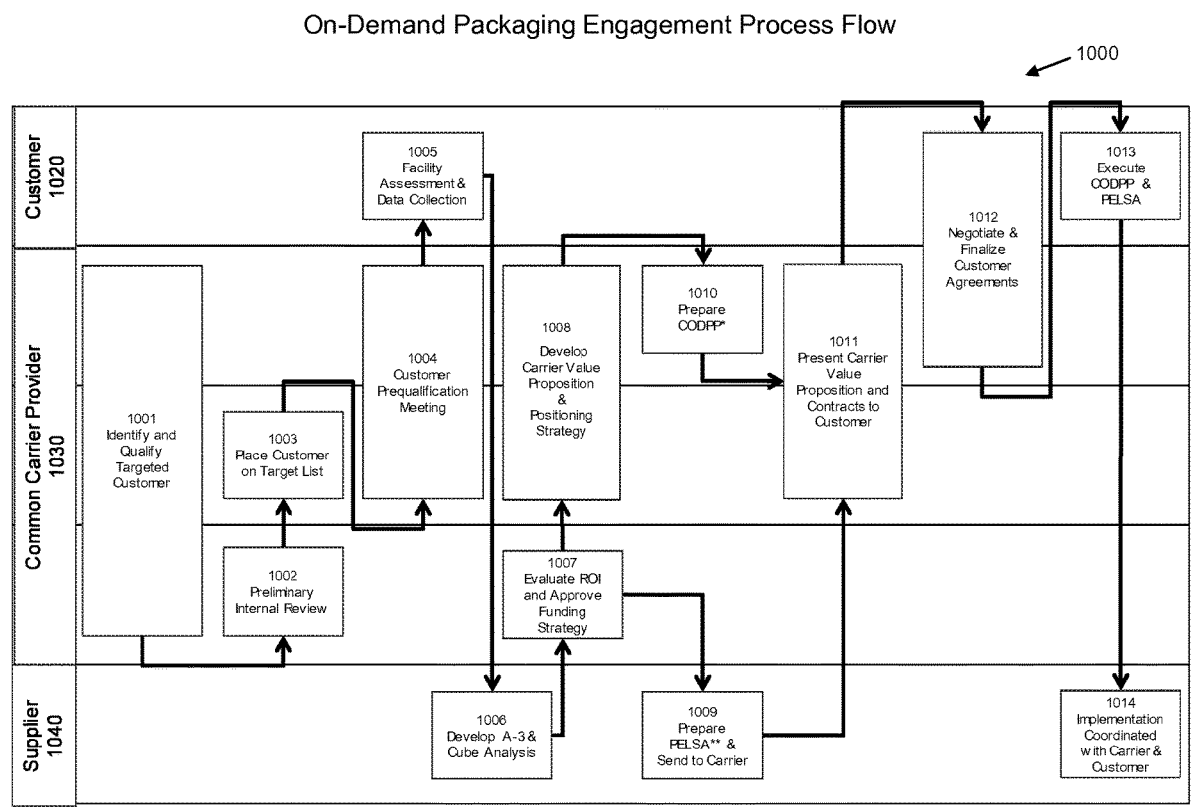

FIG. 5 is a schematic block diagram of a data module 400, a qualification module 500, an engagement module 600, a report module 700, and an implementation module 800, all as also illustrated in FIGS. 2 and 3 according to various embodiments;

FIG. 6 illustrates an exemplary process flow according to various embodiments for the data module 400 shown in FIGS. 2 and 5;

FIG. 7 illustrates an exemplary process flow according to various embodiments for the qualification module 500 shown in FIGS. 2 and 5;

FIG. 8 illustrates an exemplary process flow according to various embodiments for the engagement module 600 shown in FIGS. 2 and 5;

FIG. 9 illustrates an exemplary process flow according to various embodiments for the report module 700 shown in FIGS. 2 and 5;

FIG. 10 illustrates an exemplary process flow according to various embodiments for the implementation module 800 shown in FIGS. 2 and 5; and FIG. 11 illustrates an exemplary on-demand packaging engagement process flow for the system 20 and the representative communications between various users and parties associated therewith, as may occur according to the various embodiments also illustrated in FIGS. 1-9.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Generally speaking, various embodiments are configured to provide tools within systems, methods, and computer program products for identifying and engaging on-demand packaging customers in a consolidated fashion that provides meaningful advantages to each of a plurality of entities associated with the transport of a plurality of packages. This is accomplished at least in part by first identifying qualifying customers for use of an on-demand or "right-size" created package container, so as to reduce costs incurred by both the shipper (e.g., consignor) and a common carrier provider providing the transport services. Still further, various embodiments are configured via a streamlined engagement process that involves not only the consignor and the common carrier provider, but also the "right-size" package container supplier, so as to leverage the inventive configuration to create a shared value incentive that aids growth and retention for all involved entities. Mutually beneficial agreements are generated, to ensure a minimum volume of shipment via the common carrier provider as a condition for the consignor's receipt of the "right-size" created package container and to also ensure the common carrier provider and the third party corrugate supplier provide complementary rather than competing services to the consignor. Further details regarding the production and/or creation of the "right-size" package containers themselves may be understood from the disclosures of U.S. Patent Application Publication Nos. 2014/0067104; 2014/0059981; and 2013/0204419, the contents of each of which as are hereby incorporated by reference herein.

A high-level illustration of this on-demand customer identification and engagement process 1000 may be seen with initial reference to FIG. 11, which illustrates the various entities that may be involved therewith according to various embodiments. Such entities may include the non-limiting examples of a customer 1020 (e.g., the consignor or shipper entity), a carrier provider 1030 (which may include at least a sales department, a customer solutions department, and a revenue management department), and a third-party package material supplier 1040. As may be understood from FIG. 11, each of these three entities, in a mutually beneficial manner, may according to various embodiments take ownership of and execute specific steps, which may in turn feed and/or share generated or created data with one or more of the remaining two entities, as desirable. Each of the various steps 1001-1014 of FIG. 11 are described, in turn, below.

Beginning with step 1001 according to various embodiments, a targeted customer must be first identified and considered qualified for engagement via the on-demand packaging engagement process. A targeted customer opportunity may originate from either of the common carrier provider 1030 or the supplier 1040, although illustrated as initially handled by the common carrier provider in FIG. 11. Within the common carrier provider 1030, it should also be understood that the targeted customer opportunity may originate in any of the sales department, the customer solutions department, or the revenue management department. Non-limiting examples of criteria based upon which the customer opportunity is identified and qualified include: whether the customer's shipping volume is at least 2,000 packages per day; whether the customer's packages require large amounts of filler (e.g., 20% or more air pillows or other filler); whether shipments often consist of multiple items that are a variety of sizes and shapes; whether the customer receives recipient complaints regarding excess filler packaging; whether the customer expresses a strong commitment to "green" or environmental initiatives; whether the customer's primary business is e-commerce fulfillment; the average density of the contents of the packages; whether the customer is a conversion account; and whether the customer's sampled cube factor is greater than 1.10. It should be understood that various volume, filling percentages, and cube factor values may be other than those precisely recited herein, provided such have a pre-determined sufficiency to warrant consideration of the customer, as may be determined based upon particular scenarios.

With respect to the customer's cube factor, such generally represents the ratio of a calculated weight for a measured package size over an actual measured weight for the same measured package size. As a non-limiting example, a box having dimensions of 2 ft.×1 ft.×1.5 ft. may have a calculated weight based upon optimal utilization of the space therein of five pounds. However, upon measurement of the actual weight of this box, it is found to weigh merely one pound. Thus, the cube factor in this instance would be a value of five (5), notably greater than 1.10, as detailed above. In a general sense, it should be understood that any time the calculated cube factor is greater than one, the volume of the box is less than optimally utilized and thus may be considered ripe for possible qualification and targeting of the customer. A tolerance may be provided in certain embodiments, for example by requiring greater than 1.10 (or 1.20 or otherwise), so as to permit some degree of inefficiency in volume use prior to qualification and targeting. Indeed, many customers routinely experience calculated cube values ranging from two to three, and sometimes higher values are encountered. Of course, various configurations may be envisioned in this regard without departing from the scope and nature of the invention.

Another consideration during step 1001 is the potential for growth of business that is achievable, even if only theoretically, upon identification and qualification of the customer as targeted. For example, if there is no opportunity to gain new business and the customer does not meet most or all of the above-detailed criteria, then the customer may not, in certain circumstances, warrant targeting. In this regard, it should be understood that in certain embodiments at least a certain number or percentage of a plurality of pre-determined criteria must be satisfied prior to determining that a customer is qualified for targeting. In other embodiments, of course, satisfaction of merely one criterion may suffice, for example, where a sampled cube factor for a customer is calculated as greater than three (3), such alone may warrant further consideration via targeting. Of course, various configurations may be envisioned in this regard without departing from the scope and nature of the invention.

Turning to step 1002 according to various embodiments, upon identification and qualification of a customer for targeting, the common carrier provider 1030 may conduct an internal review, which review may be facilitated by the system and modules described elsewhere herein, for example via notification and reports associated with the same. Via the internal review, the type of customer is determined. In certain embodiments, as a non-limiting example, the determination may include at least: whether the customer is an active sales engagement (e.g., renewal, extension, or open bid) with the common carrier provider 1030, a signed account with no current small package sales activity, or a conversion account, whereby an active sales engagement may be utilized to convert competitive volume. It should be understood that underlying each of these determinations is a desire by the common carrier provider 1030 to precisely identify an optimal manner in which the on-demand "right-size" packaging opportunity will be ultimately presented to the customer in step 1011; one consideration is that regard is what type of customer account is involved. Of course, a further non-limiting example of determinations and decisions made via the internal review according to various embodiments includes determining whether the common carrier service provider 1030 will tentatively fund the on-demand "right-size" packaging machines. If funding is tentatively denied, the process ends; otherwise, the process proceeds to step 1003. Due to the funding determination aspect, in at least one embodiment, it should be understood that the internal review may be led by the revenue management department of the common carrier service provider 1030.

During step 1003 according to various embodiments, the identified and qualified customer is further evaluated for placement upon a target list. Such determination requires agreement and approval of both the common carrier provider 1030 and the supplier 1040. The common carrier provider 1030 will, in certain embodiments, compile the qualifying criteria and considerations (e.g., type of account) and provide a notification thereof to the supplier 1040. Upon receipt of the notification, the supplier 1040 may determine their current engagement with the identified customer account. If the supplier 1040 is currently engaged with the identified customer account (e.g., the two parties already have a business arrangement outside of the common carrier provider 1030), then in certain embodiments, the account is identified as "excepted" from the process, as a result of which the supplier may continue to engage the account without involvement from the common carrier provider and the process described herein and illustrated in FIG. 11 is otherwise halted. If the supplier is not previously engaged with the identified account, the account is identified according to various embodiments as "exclusive" to the process, meaning that the supplier 1040 may only further pursue the account jointly with the common carrier provider 1030. In this manner, the configuration described herein and illustrated in at least FIG. 11 provides a shared value incentive to aid grown and retention to both the common carrier provider 1030 and the supplier 1040 while also creating switching (e.g., lost business) barriers for identified, qualified, and now targeted customers. Due to the customer account aspect, in at least one embodiment, it should be understood that step 1003 may be led by the customer solutions department of the common carrier service provider 1030 with input, as appropriate from the supplier 1040.

Turning now to step 1004 and remaining with FIG. 11, according to various embodiments, upon identification, qualification, and official targeting (see step 1003) of the customer, the customer may be notified of such annotation and invited to a customer prequalification meeting with at least the common carrier provider 1030. While such may be referred to generally as a prequalification meeting, it should be understood that in certain embodiments the customer has been previously internally prequalified by the common carrier provider 1030 and/or the supplier 1040; however, the purpose of step 1004 is to gauge and determine customer-based qualification. In other words, via step 1004 according to various embodiments a determination is made as to whether the customer is interested in pursuing an on-demand "right-size" packaging arrangement with the common carrier provider 1030 and/or the supplier 1040. Notably, however, in step 1004, the details of funding and any terms of agreement are not discussed, as such is nevertheless merely a prequalification meeting to gauge customer interest in proceeding further. In certain embodiments, however, disclosure may be made of the initial criteria upon which targeting was based, so as to advise the customer of the potential advantages available by proceeding further.

In step 1005, upon completion of the customer prequalification meeting in step 1004, common carrier provider 1030 and supplier 1040 personnel will conduct a site visit with the customer 1020 so as to physically evaluate the attractiveness of the customer's facilities for the on-demand "right-size" packaging configuration. In certain embodiments, the team will gather data associated with the percent of potential packages that could be impacted via use of the new configuration and the calculated reduction in overall cube factor for those identified potential packages. Such data is vital to quantify the net cube factor reduction, which is in turn (as later described) utilized to calculate the cost savings realizable by the common carrier provider 1030 and/or the customer 1020. In one sense, this collected and quantifiable data validates the previous estimates of steps 1001-1003, which were based only on previously collected and maintained data and/or models based thereon. According to various embodiments, it should be understood that the facility evaluation envisioned within step 1005 encompasses not only an assessment of the facilities themselves, but also of operations, production capabilities, and the like, as conducted by the customer therein or there-through, however as may be desirable for particular applications.

Remaining with FIG. 11 and proceeding to step 1006, the process is handed next to the supplier 1040, which is responsible for completing a supplier business case and cube factor analysis, the results and conclusions of which are fully documented. Generated documentation is shared with the common carrier provider 1030, for example with the sales department, the customer solutions department, and the revenue management department thereof. Upon receipt of the generated business case and cube factor analysis documentation from the supplier 1040, the common carrier provider 1030 according to various embodiments proceeds in step 1007 to review and analyze the same so as to determine a quantifiable return on investment (ROI) and based thereon approve a funding strategy for the engagement with the targeted and now vetted customer. Practically speaking, during step 1007, clarification is sought so as to identify what the common carrier provider stands to gain via the arrangement, whether that is increased volume of shipping packages, reduced cube factors, or otherwise.

Upon analysis and quantification of the supplier provided documents in step 1007, according to various embodiments, the common carrier provider 1030 proceeds to determine whether final funding is approved. In certain embodiments, funding may be approved under two exemplary scenarios, namely when the common carrier provider 1030 stands to receive new business in a bundle proposal with the customer 1020 or when there is no new business involved but the reduction to the common carrier provider's operational expenses exceeds the costs of implementation of the on-demand "right-size" configuration. In still other embodiments, where none of the above-identified scenarios are satisfied, partial funding may nevertheless be approved, such that the process and implementation of the configuration may proceed, but without common carrier provider 1030 obtaining title and ownership of the on-demand "right-size" machines. For example, the common carrier provider 1030 may instead of fully-funding the endeavor, simply pay a license fee for joint usage of the machinery and configuration, with the supplier 1040 retaining title and ownership thereof. A variety of arrangements may, of course, be envisioned, provided each are configured so as to weigh the financial benefits to each of the involved funding parties in a mutually agreeable and advantageous manner. Further details in this regard will be provided elsewhere herein.

Turning now to step 1008, the common carrier provider 1030 will according to various embodiments, upon approval of a quantifiable funding strategy (e.g., whether full or partial in nature), develop and generate a value proposition and positioning strategy, which will be provided ultimately to the targeted and vetted customer (see step 1011). The value proposition in certain embodiments includes identification of savings from all possible areas as a result of implementation of the on-demand "right-size" packaging configuration. Such savings on the customer side may include at least the non-limiting examples of reduced corrugate spend, reduced filler spend, inventory reductions, labor reductions, freight weight reductions, and the like. The value proposition in certain embodiments may also include a share of savings to the common carrier provider 1030 as a result of the cube factor reduction, which notably improves density of packages and thus enables the provider to more efficiently use container transport volume.

In these and other embodiments, the value proposition is accompanied by a positioning strategy, which may document a leverage plan that includes pricing, negotiation parameters, walk-away cliffs, and the like, as may be important for the common carrier provider 1030 to quantify prior to meeting physically with the customer 1020. In certain embodiments, the negotiation parameters and/or general strategy may further include a leveraged bundle of new customer services provided the business is accepted by the customer. In this manner, a bundle of mutually beneficial incentives may be provided, benefiting not only the customer 1020 and the common carrier provider 1030 in certain embodiments, but also the supplier 1040.

Upon approval of the quantifiable funding strategy in step 1007, the supplier 1040 according to various embodiments generates in step 1009 a Preferred Equipment Loan and Supply Agreement (PELSA) document, which will be forwarded at least to the common carrier service provider 1030 for inclusion in the provider's Customer On-Demand Packaging Program Agreement (CODPP) document (see step 1010). Upon sharing of the PELSA document as between the supplier 1040 and the common carrier service provider 1030, each entity in step 1009 tangibly agrees thereto, which may be in certain embodiments reflected as an addendum to the CODPP document, as generated in step 1010. Generally speaking, according to various embodiments, the CODPP document, which is generated at least partially in parallel with the PELSA, as evident from FIG. 11, outlines several non-limiting conditions of providing the on-demand "right-size" packaging program or configuration to the customer 1020. These non-limiting conditions include in certain embodiments: what the common carrier provider 1030 expects from the customer 1020 in exchange for the program (e.g., additional volume, additional revenue, avoidance of competitor's bid, etc.); any defined benefit that the common carrier provider is offering the customer (e.g., rebate, credit, rate adjustment, etc.); and termination conditions and fees in the case of customer default, as may be due to one or more the common carrier provider and/or the supplier 1040 (e.g., via the PELSA, as incorporated into the CODPP documentation, as previously described herein).

Remaining with FIG. 11, it may be seen that upon generation of documentation in steps 1009 and 1010, the engagement process flow 1000 proceeds to step 1011, wherein the carrier value proposition and the supporting documents therefor (e.g., the CODPP and the PELSA) are provided to (e.g., transmitted to, presented to, or otherwise) the customer 1020. In certain embodiments, the common carrier provider 1030 will spearhead the provision and notification of this documentation, with the supplier 1040 providing technical support as needed, for example, to demonstrate to the customer tangible features of the on-demand "right-size" packaging machines provided as a portion of the configuration.

Again with FIG. 11, negotiation and finalization of the documentation between the entities 1020-1040 may then occur, as necessary, during step 1012, followed by execution (e.g., signature, notary, etc.) of the documents thereafter during step 1013, followed ultimately by implementation during step 1014, which may include at least activities associated with conversion of the customer site to the on-demand "right-size" packaging configuration, involving installation of custom machinery and the like, however, as may be necessary or appropriate in various scenarios.

Having thus described the on-demand "right-size" engagement process 1000 as illustrated in FIG. 11 in the context of the involved entities 1020-1040, the system 20 (see FIG. 1) and associated modules 400-800 therein will now be described, in turn, below, as such may be configured according to various embodiments to provide electronic and, at least to some degree automated, implementation of the process 1000 described herein.

Exemplary Apparatuses, Methods, Systems, Computer Program Products, & Computing Entities Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary Architecture of System 20

FIG. 1 is a block diagram of a system 20 that can be used in conjunction with various embodiments of the present invention. In at least the illustrated embodiment, the system 20 may include one or more central computing devices 110, one or more distributed computing devices 120, and one or more distributed handheld or mobile devices 300, all configured in communication with a central server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the distributed computing device(s) 100, the distributed handheld device(s) 110, the central computing device(s) 120, and the server 200 are illustrated in FIG. 1 as communicating with one another over the same network 130, these devices may likewise communicate over multiple, separate networks. For example, while the central computing devices 120 may communicate with the server 200 over a wireless personal area network (WPAN) using, for example, Bluetooth techniques, one or more of the distributed devices 100, 110 may communicate with the server 200 over a wireless wide area network (WWAN), for example, in accordance with EDGE, or some other 2.5G wireless communication protocol.

According to one embodiment, in addition to receiving data from the server 200, the distributed devices 110, 120, and/or 300 may be further configured to collect and transmit data on their own. In various embodiments, the devices 110, 120, and/or 300 may be capable of receiving data via one or more input units or devices, such as a keypad, touchpad, barcode scanner, radio frequency identification (RFID) reader, interface card (e.g., modem, etc.) or receiver. The devices 110, 120, and/or 300 may further be capable of storing data to one or more volatile or non-volatile memory modules, and outputting the data via one or more output units or devices, for example, by displaying data to the user operating the device, or by transmitting data, for example over the one or more networks 130. One type of a distributed handheld device 110, which may be used in conjunction with embodiments of the present invention is the Delivery Information Acquisition Device (DIAD) presently utilized by UPS.

Turning momentarily to FIG. 11, an exemplary on-demand packaging engagement process flow 1000 for the system 20 according to the various embodiments of FIGS. 1-9 is illustrated. As may be understood therefrom, [at least three parties/entities].

Exemplary Server 200

In various embodiments, the server 200 includes various systems for performing one or more functions in accordance with various embodiments of the present invention, including those more particularly shown and described herein. It should be understood, however, that the server 200 might include a variety of alternative devices for performing one or more like functions, without departing from the spirit and scope of the present invention. For example, at least a portion of the server 200, in certain embodiments, may be located on the distributed device(s) 110, 120, and/or the handheld or mobile device(s) 300, as may be desirable for particular applications. As will be described in further detail below, in at least one embodiment, the handheld or mobile device(s) 300 may contain one or more mobile applications 330 which may be configured so as to provide a user interface for communication with the server 200, all as will be likewise described in further detail below.

FIG. 2A is a schematic diagram of the server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200. Various ROM and RAM configurations have been previously described herein.

In addition, the server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processor 230, may be stored by the various storage devices 210 and within RAM 222. Such program modules include an operating system 280, a data module 400, a qualification module 500, an engagement module 600, a report module 700, and an implementation module 800. In these and other embodiments, the various modules 400, 500, 600, 700, 800 control certain aspects of the operation of the server 200 with the assistance of the processor 230 and operating system 280. In still other embodiments, it should be understood that one or more additional and/or alternative modules may also be provided, without departing from the scope and nature of the present invention.

In various embodiments, the program modules 400, 500, 600, 700, 800 are executed by the server 200 and are configured to generate one or more graphical user interfaces, reports, instructions, and/or notifications/alerts, all accessible and/or transmittable to various users of the system 20. In certain embodiments, the user interfaces, reports, instructions, and/or notifications/alerts may be accessible via one or more networks 130, which may include the Internet or other feasible communications network, as previously discussed. The operation and interaction of the program modules 400, 500, 600, 700, 800 is described in further detail elsewhere herein.

In various embodiments, it should also be understood that one or more of the modules 400, 500, 600, 700, 800 may be alternatively and/or additionally (e.g., in duplicate) stored locally on one or more of the devices 110, 120, and/or 300 and may be executed by one or more processors of the same. According to various embodiments, the modules 400, 500, 600, 700, 800 may send data to, receive data from, and utilize data contained in one or more databases (see FIG. 4), which may be comprised of one or more separate, linked and/or networked databases.

Also located within the server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Distributed Handheld (or Mobile) Device(s) 300

FIG. 2B provides an illustrative schematic representative of a mobile device 300 that can be used in conjunction with various embodiments of the present invention. Mobile devices 300 can be operated by various parties. As shown in FIG. 2B, a mobile device 300 may include an antenna 312, a transmitter 304 (e.g., radio), a receiver 306 (e.g., radio), and a processing element 308 that provides signals to and receives signals from the transmitter 304 and receiver 306, respectively.

The signals provided to and received from the transmitter 304 and the receiver 306, respectively, may include signaling data in accordance with an air interface standard of applicable wireless systems to communicate with various entities, such as the server 200, the distributed devices 110, 120, and/or the like. In this regard, the mobile device 300 may be capable of operating with one or more air interface standards, communication protocols, modulation types, and access types. More particularly, the mobile device 300 may operate in accordance with any of a number of wireless communication standards and protocols. In a particular embodiment, the mobile device 300 may operate in accordance with multiple wireless communication standards and protocols, such as GPRS, UMTS, CDMA2000, 1 xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 300 may include a location determining device and/or functionality. For example, the mobile device 300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 300 may also comprise a user interface (that can include a display 316 coupled to a processing element 308) and/or a user input interface (coupled to a processing element 308). The user input interface can comprise any of a number of devices allowing the mobile device 300 to receive data, such as a keypad 318 (hard or soft), a touch display, voice or motion interfaces, or other input device. In embodiments including a keypad 318, the keypad can include (or cause display of) the conventional numeric (0-9) and related keys (#, *), and other keys used for operating the mobile device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 300.

The mobile device 300 may also include one or more of a camera 326 and a mobile application 330. The camera 326 may be configured according to various embodiments as an additional and/or alternative data collection feature, whereby one or more items may be read, stored, and/or transmitted by the mobile device 300 via the camera. The mobile application 330 may further provide a feature via which various tasks may be performed with the mobile device 300. Various configurations may be provided, as may be desirable to facilitate use and access of the system 20 described herein by one or more users via the mobile device 300.

Server 200 Logic Flow

Reference is now made to FIGS. 3-10, which illustrate various logical process flows executed by various embodiments of the modules described previously herein. In particular, FIG. 3 illustrates the overall relationship of the modules 400, 500, 600, 700, 800 of the server 200, according to various embodiments. As illustrated, operation of the system 20 via the server 200 begins, according to various embodiments, with the execution of the data module 400 (see also FIG. 5), which receives, stores, manages, and transmits a variety of data, such as the non-limiting examples of qualification data 401, customer data 402, carrier data 403, supplier data 404, engagement data 405, and implementation data 406.

At least portions of the data 401 is provided, as desirable, to the qualification module 500, as will be described in further detail below. Other portions of the data 402-404 may be provided to one or more tools of the engagement module 600, while the engagement data 405 and the implementation data 406 may be provided, as and/or when necessary to the report module 700 and the implementation module 800, respectively, again as will be described in further detail below. It should be understood, of course, that according to various embodiments, any portion of the data 401-406 may be exchanged in a one or two directional fashion between any set combinations of the modules 400-800 of the server 200, as may be desirable without departing the scope of the inventive concepts described herein.

With continued reference to FIGS. 3 and 5, the qualification module 500 is generally configured according to various embodiments to execute one or more tools (e.g., a qualification tool 510) that identifies and qualifies potential customers (whether existing or wholly new relative to the common carrier provider (see FIG. 11)). In certain embodiments, as previously detailed herein, a plurality of criteria is analyzed by the tool 510, the satisfaction of one or more thereof as may result in identification of the customer as qualified and ripe for targeting. In at least one embodiment, a certain threshold number or percentage of the criteria must be satisfied, although in other embodiments, satisfaction of merely a single criteria may suffice, as may be desirable for particular scenarios. In any of these and still other embodiments, execution of the qualification tool 510 results in preliminary data 515, which may be forwarded to the engagement module 600 and/or the report module 700, at least the latter of which being desirable in certain instances for purposes of alerting and/or otherwise notifying one or more users of the system 20 (e.g., common carrier service providers, suppliers, and the like) of the preliminary data. Further details in this regard will be provided elsewhere herein, but it should be understood that execution of the qualification tool 510 corresponds substantially to the execution of step 1001 of FIG. 11, as previously detailed herein.

Remaining with FIGS. 3 and 5, the engagement module 600 is generally configured according to various embodiments to execute one or more tools (e.g., a targeting tool 610 and an engagement (i.e., engage) tool 615) so as to facilitate the customer engagement process (see steps 1002-1008 of FIG. 11). In certain embodiments, the targeting tool is configured to determine what type of customer is being targeted, be it an active sales engagement customer, a signed account customer, or a conversion account customer. Still further types of customers may be identified and/or analyzed, as may be desirable for certain applications. In any event, based upon the type classification, the targeting tool 610 according to various embodiments may determine whether funding of continuing process steps is warranted.

If funding is determined as warranted, the targeting tool 610 may be further configured according to these and still other embodiments to determine whether the customer should be classified as an exclusive on-demand engagement customer or as a customer "excepted" from the on-demand engagement process based upon one or more parameters, as will be detailed elsewhere herein. Once type-determined and classified, in at least one embodiment, the targeting tool 610 is configured to generate targeting data 612, which may be transmitted to at least the engagement tool 615 and/or the report module 700. Further details in this regard will be provided elsewhere herein, but it should be understood that execution of the targeting tool 610 corresponds substantially to the execution of steps 1002-1004 of FIG. 11, as previously detailed herein.

The engagement module 600 is generally configured according to various embodiments to, upon execution of the targeting tool 610 and generation of the targeting data 612 (see again FIG. 5), execute the engagement tool 615, which in turn generates facility data 616, funding data 617, strategic data 618, and/or customer agreements or contracts 619. The data 616-619 generated by the engagement tool 615 corresponds substantially the facility assessment, cube analysis, ROI evaluation, funding approval, and value proposition and positioning strategy development of steps 1005-1008 of FIG. 11, as previously detailed herein. For example, the targeting tool 610 may be configured to determine the percent of potential packages that could be impacted and the reduction in overall cube factor based therein, as performed via step 1005. The targeting tool 610 may also be configured to determine whether funding approval is granted based at least in part upon the two scenarios detailed in step 1007 previously herein. Various configurations may be envisioned, as within the scope and content of the capabilities of the engagement tool 615 of the engagement module 600, all of course as will be further detailed herein-below.

According to various embodiments, upon generation of data 616-619 by the engagement module 600, such is likewise transmitted to at least the report module 700 (see FIGS. 3 and 5), which is configured to not only provide periodic or timely alerts 712 and/or reports 715 to one or more users of the system 20, but also to generate one or more documents 718, as necessary. Thus, while notifications may be transmitted to one or more users upon generation of preliminary data 515 and/or targeting data 612, upon generation of data 616-619 subsequent thereto, the report tool 710 may be configured according to various embodiments to generate at least the PELSA and the CODPP documents (embodied as 718), corresponding substantially to execution of steps 1009 and 1010 of FIG. 11 as previously detailed herein. Further details in this regard will be provided herein-below.

With continued reference to FIGS. 3 and 5, according to various embodiments, upon generation of one or more documents 718, such may be transmitted to at least the implementation module 800 for further processing via execution of an implementation tool 810. In certain embodiments, a notification of generation of the documents 718 may be re-executed via the report tool 710 so as to generate one or more alerts and/or reports 712, 715, as may be desirable. In any event, upon execution of the implementation tool 810, negotiation, finalization, and execution of the documents may occur and instructions 815 for implementation of the on-demand "right-size" packaging configuration may be created and transmitted to one or more users of the systems. Although further details in this regard will be provided elsewhere herein, it should be understood that execution of the implementation tool 810 corresponds substantially to at least steps 1012-1014 of FIG. 11, as previously detailed. It should also be understood that the alert and/or report generation features available via the report tool 710 may comprise ongoing monitoring of one or more parameters upon completion of implementation, for example so as to ensure that an engaged customer continues to satisfy the volume threshold of (as a non-limiting example) 2,000 packages, as described elsewhere herein.

Again, as mentioned, the above and other details regarding the modules 500-800 are described in further detail below. Specifically, detailed steps performed by various embodiments of the data module 400 are described in relation to FIG. 6; steps performed by various embodiments of the qualification module 500 are described in relation to FIG. 7; steps performed by various embodiments of the engagement module 600 are described in relation to FIG. 8; steps performed by various embodiments of the report module 700 are described in relation to FIG. 9; and steps performed by various embodiments of the implementation module 800 are described in relation to FIG. 9.

Figure 4:
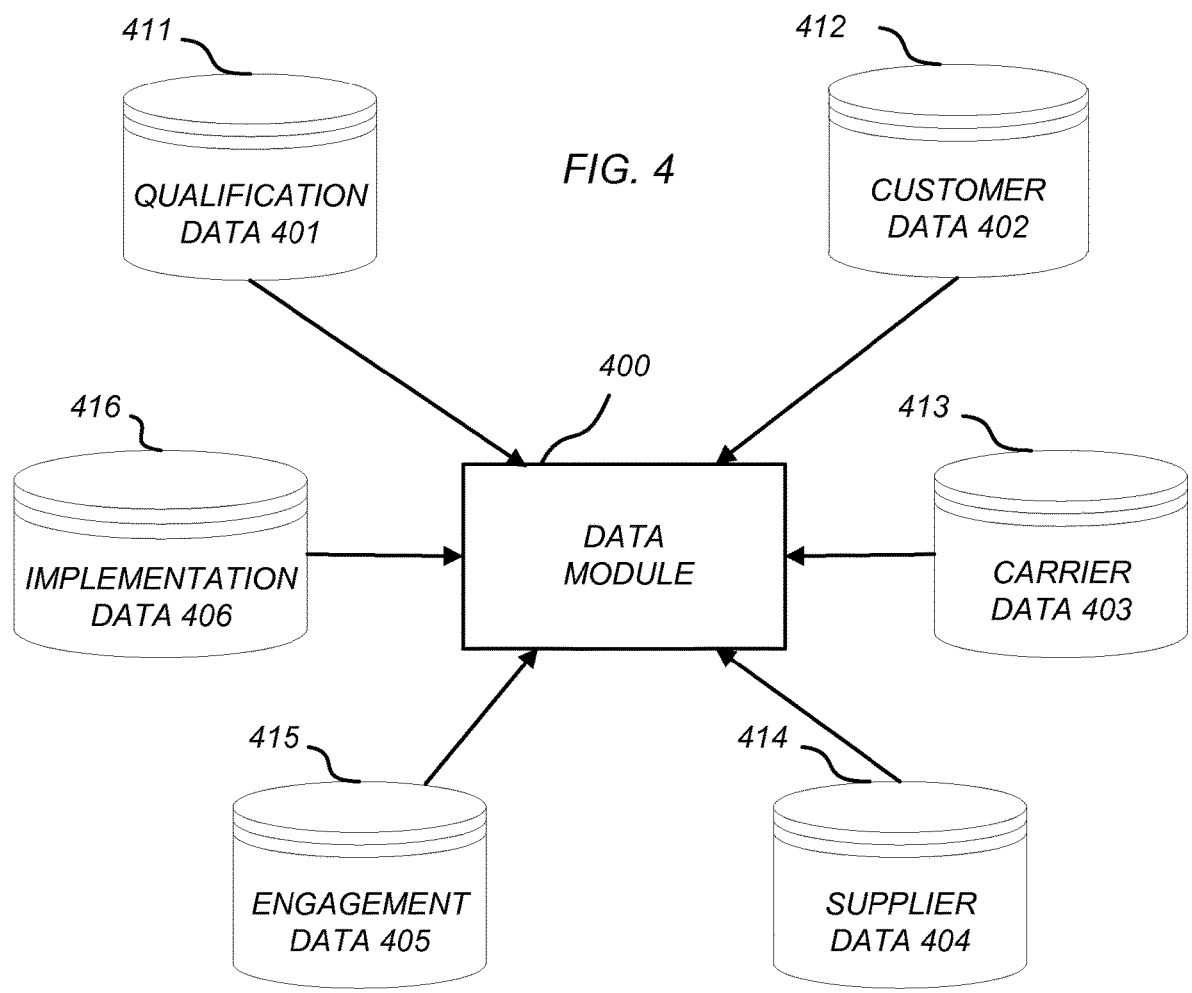
FIG. 4 illustrates a schematic diagram of various databases that are utilized by the system 20 shown in FIG. 1 according to various embodiments.

With reference now to FIG. 4, such illustrates a block diagram of various exemplary databases via which the data module 400 manages a variety of data (see also FIG. 5). In particular, in at least the embodiment shown in FIG. 4, the following databases are provided: a qualification data database 411, a customer data database 412, a carrier data database 413, a supplier data database 414, an engagement data database 415, and an implementation data database 416. Although the embodiment of FIG. 4 shows these databases 411-416 as being separate databases each associated with different types of data, in various other embodiments, some or all of the data may be stored in the same database. In still other embodiments, additional and/or alternative databases may be provided, as may also be desirable for particular applications.

According to various embodiments, the qualification data database 411 may be configured to store and maintain a variety of qualification data 401. In certain embodiments, the qualification data 401 may comprise information associated with and/or otherwise collected and related to one or more criteria based at least in part upon qualifications of a potential customer are assessed. Non-limiting examples of such data 401 comprise: customer shipping volume data over time, customer package filler percentage data over time, item consistency data for shipments containing multiple over-packed items, customer received complaint data, customer green or environmental policy or initiative data; fulfillment data, package density data, customer account type data, and package cube factor data over time. With respect to the customer's cube factor, as previously mentioned, such generally represents the ratio of a calculated weight for a measured package size over an actual measured weight for the same measured package size. That being said, it should be understood that according to various embodiments, a variety of types of information, criteria, and/or parameters, along with details regarding the same may be contained within the qualification data 401 and stored within the qualification data database 411, however as may be desirable and/or beneficial for purposes of determining whether an identified customer of interest should qualify for further evaluation under the on-demand "right-size" package engagement process. Still further, any of a variety of parameters may be of interest, beyond those detailed above. It should further be understood that the qualification data 401 within the database 411 may be received in its entirety (or piecemeal) from a variety of sources, either external or internal to the system 20 described herein, as may be appropriate given particular applications.

In all of these and still other embodiments, it should be understood that, upon receipt of at least some portion of qualification data 401, the qualification data database 411 will store any newly received data in a manner associated with at least the data module 400 and for provision (whether automatically, manually, upon query therefor, whether now or at a later time) to one or more of the modules 500-800, as will also be described in further detail below. Of course, in any of these and still other embodiments, a variety of alternative configurations and/or components of qualification data 401 may exist, as may be desirable for certain applications.

According to various embodiments and with continued reference to FIG. 4, the customer database 412 may be configured to store and maintain customer data 402. In certain embodiments, the customer data 402 comprises at least the non-limiting examples of customer facility data, including site capabilities, existing configurations thereon, and the like. In these and other embodiments, the customer data 402 may further comprise data associated with the parameters and criterion described previously herein in the context of qualification data 401 with the understanding that such data 402 may inform and populate the parameters and/or criterion themselves. In certain embodiments, the customer data 402 may further comprise customer strategic-oriented data, such as customer account information, customer growth expectations, customer revenue expectations or projections, and the like.

According to various embodiments, at least portions of the customer data 402 may be observed and/or otherwise recorded into the system by customer or common carrier-based personnel, each via one or more mobile devices and/or distributed computing devices of the system 20, as have been described previously herein. In these and other embodiments, it should be understood that, upon receipt of such data 402, the customer data database 412 will store any such data in a manner associated with at least the data module 400 and for provision (whether automatically, manually, upon query therefor, whether now or at a later time) to at least one of the modules 500-800, as will also be described in further detail below. Of course, in any of these and still other embodiments, a variety of alternative configurations and/or components of customer data 402 may exist, as may be desirable for certain applications.

According to various embodiments and with continued reference to FIG. 4, the carrier data database 413 may be configured to store and maintain carrier data 403. In certain embodiments, the carrier data 403 comprises at least the non-limiting examples of carrier account data, including those customers and third parties with which the carrier is actively engaged or otherwise bidding or pursuing. The carrier data 403 may additionally and/or alternatively further comprise carrier strategic considerations and assessments, including funding, ROI, value proposition, and positioning strategy data, as non-limiting examples. According to various embodiments, at least portions of the carrier data 403 may be observed and/or otherwise recorded into the system by common carrier-based personnel, via one or more mobile devices and/or distributed computing devices of the system 20, as have been described previously herein. In these and other embodiments, it should be understood that, upon receipt of such data 403, the carrier data database 413 will store any such data in a manner associated with at least the data module 400 and for provision (whether automatically, manually, upon query therefor, whether now or at a later time) to at least one of the modules 500-800, as will also be described in further detail below. Of course, in any of these and still other embodiments, a variety of alternative configurations and/or components of carrier data 403 may exist, as may be desirable for certain applications.

According to various embodiments and with continued reference to FIG. 4, the supplier data database 414 may be configured to store and maintain supplier data 404. In certain embodiments, the supplier data 404 comprises at least the non-limiting examples of supplier account data, including those customers and third parties with which the supplier is actively engaged or otherwise bidding or pursuing. The supplier data 404 may additionally and/or alternatively further comprise supplier strategic considerations and assessments, including cube factor algorithms, on-demand "right-size" pricing terms and bundles, and the like, as non-limiting examples. According to various embodiments, at least portions of the supplier data 404 may be observed and/or otherwise recorded into the system by supplier-based personnel, via one or more mobile devices and/or distributed computing devices of the system 20, as have been described previously herein. In these and other embodiments, it should be understood that, upon receipt of such supplier data 404, the supplier data database 414 will store any such data in a manner associated with at least the data module 400 and for provision (whether automatically, manually, upon query therefor, whether now or at a later time) to at least one of the modules 500-800, as will also be described in further detail below. Of course, in any of these and still other embodiments, a variety of alternative configurations and/or components of supplier data 404 may exist, as may be desirable for certain applications.

According to various embodiments and with continued reference to FIG. 4, the engagement data database 415 may be configured to store and maintain engagement data 405. In certain embodiments, the engagement data 405 comprises one or more parameters, whether substantively or formatting related, required for and associated with the production of one or more contracts 619 and/or documents 718 (see FIG. 5), as detailed elsewhere herein. Such data may include the non-limiting examples of parameters and information associated with the PELSA, CODPP, and consolidated customer agreement documents, as detailed with respect to steps 1009-1012 of FIG. 11 and elsewhere herein. The engagement data 405 may further comprise one or more pre-established terms or parameters, as between the common carrier service provider and the supplier, as may have been previously agreed upon so as to further facilitate and expedite the engagement and/or negotiation process with new customers. Of course, in any of these and still other embodiments, a variety of alternative configurations and/or components of engagement data 405 may exist, as may be desirable for certain applications.

According to various embodiments and with continued reference to FIG. 4, the implementation data database 416 may be configured to store and maintain implementation data 406. In certain embodiments, the implementation data 406 comprises one or more parameters, whether substantively or otherwise related, required for and associated with the implementation of an on-demand "right-size" packaging production configuration upon execution of the agreement documents by the one or more users (e.g., customer, carrier, and supplier) of the system. In certain embodiments, the implementation data 406 may comprise at least in part textual instructions, while in other embodiments the implementation data 406 may comprise at least in part one or more algorithms configured to facilitate implementation of a pre-established or pre-populated set of steps to implement the machines, facilities, and equipment that constitute the physical embodiment of the executed documents. Of course, in any of these and still other embodiments, a variety of alternative configurations and/or components of implementation data 406 may exist, as may be desirable for certain applications.

According to various embodiments, any of the previously described databases may be configured to store and maintain not only textually based data, but also graphically based data, as may be generated by the system 20 (or otherwise) and be based, at least in part, upon the textually based data. Still further graphical (e.g., charts, graphs, maps, documents, etc.) may also be stored within one or more of the databases, wherein such may be, at least in part, independently derived, relative to the textually based data. It should also be understood that in any of these and still other embodiments, the graphically based data may be used to visually combine various portions of data contained within the various databases previously described herein. Still further, various algorithms and/or pre-determined parameters, rules, and/or engagement or implementation procedures may also be stored in any of the various databases within the system 20, as may be desirable for various applications, to the extent such have not been previously described and/or allocated herein. The handling of this data 401-406 via one or more modules 400-800 is described, in turn, below, with reference further to previously detailed FIG. 11, as necessary.

Data Module 400

According to various embodiments and as previously mentioned herein, the data module 400 is configured to receive, store, manage, and transmit a variety of qualification data 401, customer data 402, carrier data 403, supplier data 404, engagement data 405, and implementation data 406. Receipt may be from any of a variety of entities (e.g., a common carrier service provider 1030, a customer 1020, a supplier 1040 (see all in FIG. 11), or otherwise) and transmission thereof may be to one or more of the modules 500-800, as will be described in further detail below. In certain instances, transmission may be one-way, only to the one or more modules 500-800 for further processing; however, in other embodiments, at least some transmissions may be two-directional, as may be desirable for certain applications. It should also be understood that according to various embodiments, in some instances only a portion of certain types of data 401-406 may be transmitted to particular modules, for example, on an "as-needed" or "as-requested" basis. For example, transmission of carrier data 403 may be a two-part (or more) process, whereby at least certain carrier account details as a subset thereof may be first transmitted to a targeting tool 610 (see FIG. 5), with at least certain strategic parameters and associated funding information and the like (also a subset of the carrier data as previously detailed herein) may be retained by the data module 400 and only subsequently provided to the engagement tool 615 of the engagement module upon receipt of a request or query therefor. Of course, a variety of alternative configurations for data segregation and transmission may be envisioned, without departing from the scope and nature of the embodiments described herein.

That being said, FIG. 6 illustrates non-limiting and exemplary steps that may be executed by the data module 400 according to various embodiments. Beginning with step 420, the data module 400 assesses whether any data (e.g., qualification data 401) has been received by the module. In certain embodiments, the data module 400 makes this assessment by periodically scanning one or more databases (see FIG. 4) associated with the module and by identifying some portion of data within one or more of the databases that was not present during a previous periodic scan under step 420. Of course, alternative configurations may be envisioned, wherein, as a non-limiting example, the data module 400 may actively receive data (e.g., as input by a user of the system 20 via an interface, whether web-based or otherwise) and upon receipt thereof, execute step 430. As a non-limiting example, as has been referenced elsewhere herein, the data module may be configured according to certain embodiments to automatically transmit qualification data 401 upon receipt thereof to at least the qualification module 500 so as to in a real-time (or near real-time) fashion initiate execution of the one or more tools contained therein.

In certain embodiments, data other than qualification data 401 may be received, in which case the data module 400 may be configured to remain in the "static loop" of steps 420 and 425 pending receipt of qualification data so as to initiate execution of additional modules. In other embodiments, however, initial receipt of qualification data 401 prior to transmission of one or more portions of data 402-406 or otherwise may not be mandated, as may be desirable for particular scenarios or applications.

As previously mentioned, with reference again to FIG. 6, in any of these and still other various embodiments, if "newly received" data 401-406 is identified, the data module 400 proceeds to step 430; otherwise the module proceeds into a static loop via step 425. During step 425, the data module 400 may be configured to passively stand by for receipt of new data, in some embodiments for qualification data 401 in particular. In certain embodiments, the module 400 may, in step 425, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

According to various embodiments, during step 430, the data module 400 is configured to transmit at least a portion of data 401-406 to at least the qualification module 500 (see also FIG. 5). In at least the illustrated embodiment, only qualification data 401 is transmitted to the qualification module 500, while data 402-404 is transmitted instead to the engagement module 600, either concurrently or subsequently thereto, however as may be desirable. In these and still other embodiments, the engagement data 405 and the implementation data 406 may be provided solely to the report module 700 and the implementation module 800, respectively, again as may be desirable for particular scenarios or applications. Of course, a variety of alternative combinations of data transmission to any combination of the modules 500-800 may be envisioned without departing the nature and scope of the embodiments described herein.

As mentioned, in these and other embodiments, transmission of one or more portions of data 401-406 to various modules 500-800 may be simultaneously, while in still other embodiments, transmission may be sequential and temporally spaced, as may be desirable or necessary for particular applications. For example, engagement data 405 may only be transmitted to the report module 700 (see FIG. 5) upon receipt thereby of data 616-618 generated by the engagement module 600. As another non-limiting example, data 402-404 may only be transmitted to the engagement module 600 upon activation of its engagement tool 615, which may be configured to occur only upon generation of targeting data 612 (see again FIG. 5). In any event, in these and still other embodiments, only a portion of the data may be transmitted automatically upon receipt thereof, while receipt of other data may not result in any automatic transmission thereof pending further subsequent activity that operates as a trigger for transmission of data.

Of course, various configurations may be envisioned, whereby, in certain embodiments, the data module 400 may be configured to automatically perform step 430, while in other embodiments, the module may perform such only periodically, at an interval predetermined by one or more users of the system 20, as may be desirable for particular applications. In any of these and still other embodiments, any portion of the data may be otherwise exchanged, whether automatically or upon request therefor, with or from the remaining module 500-800, as may be desirable for certain applications, as compared with the provision of such data from and by the data module 400 as an initiator thereof.

Qualification Module 500

According to various embodiments and as previously mentioned herein, the qualification module 500 is generally configured according to various embodiments to execute one or more tools (e.g., a qualification tool 510) that identifies and qualifies potential customers (whether existing or wholly new relative to the common carrier provider (see FIG. 11)).

FIG. 7 illustrates non-limiting and exemplary steps that may be executed by the qualification module 500 according to various embodiments. Beginning with step 520, the qualification module 500 according to various embodiments assesses whether any data (e.g., qualification data 401) has been received by the module. In certain embodiments, the qualification module 500 makes this assessment by periodically scanning one or more databases (see FIG. 4) associated with the module and by identifying some portion of data within one or more of the databases that was not present during a previous periodic scan under step 520. In other embodiments, the qualification module 500 makes this assessment by periodically scanning its internal module so as to see if some new portion of data has been received from the data module 400. Of course, alternative configurations may be envisioned, wherein, as a non-limiting example, the qualification module 500 may actively receive data (e.g., as input by a user of the system 20 via an interface, whether web-based or otherwise) and upon receipt thereof, execute step 530. As another non-limiting example, as has been referenced elsewhere herein, the qualification module 500 may be configured according to certain embodiments to automatically receive qualification data 401 from at least the data module 400 so as to in a real-time (or near real-time) fashion initiate execution of at least the qualification tool 510 upon identification of receipt thereof. In these and still other embodiments, data other than qualification data 401 may be received, in which case the qualification module 500 may be configured to remain in the "static loop" of steps 520 and 525 pending receipt of qualification data so as to initiate execution of qualification tool 510.

According to various embodiments and with continued reference to FIG. 7, it may be seen that execution of the qualification tool 510 according to step 530 generally results in generation of preliminary data 515 in step 540. In certain embodiments, the preliminary data 515 may comprise data associated with an evaluation of the criteria within the qualification data 401, so as to provide an indication of whether the identified customer(s) satisfy one or more of the criteria so as to warrant classification as "qualified" for further consideration. As previously mentioned, non-limiting examples of such criteria include customer shipping volume data over time, customer package filler percentage data over time, item consistency data for shipments containing multiple over-packed items, customer received complaint data, customer green or environmental policy or initiative data; fulfillment data, package density data, customer account type data, and package cube factor data over time.

As a non-limiting example, the preliminary data 515 may indicate that volume is greater than 2,000 packages per day, that greater than 20% of the package volume is "filler" material, that shipments regularly contain multiple items therein, and that the sampled cube factor (expected/actual) is greater than 1.10. In such scenario, the customer would be identified within the preliminary data 515 as duly "qualified" according to various embodiments, based at least in part upon satisfying at least a certain portion of the pre-established criteria. It should be understood that any of a variety of criterion may be established, as may be desirable and that those described herein are exemplary and non-limiting in nature. In these and still other embodiments, in addition to or alternatively to an indication of "qualification," the preliminary data 515 may include a listing of results relative to the criteria, in response to receipt of which (see step 550), one or more users of the system may in a near-real-time fashion and with an additional degree of flexibility, determine and provide a response as to qualification. Indeed, a variety of configurations may be envisioned for assessing customer qualification, whether based upon pre-established criteria, a real-time evaluation, and/or a mixture and combination of the same, provided that in any case such data is captured within the generated preliminary data 515.

Returning to FIG. 7, upon generation of the preliminary data 515 in step 540, such may be transmitted to at least the engagement module 600 and/or the report module 700 in step 550. Transmission to the engagement module 600 is configured according to various embodiments to facilitate further analysis and evaluation as the on-demand "right-size" packaging engagement process 1000 (see FIG. 11) proceeds. Transmission to the report module 700 may be beneficial where notification and/or further analysis and/or input by one or more users is desired prior to further proceeding, upon an initial determination by the qualification tool 510 as to "qualification" status. In this regard, various configurations and embodiments may be envisioned, without departing from the scope and intent of the present invention, which seeks to pre-qualify identified customers prior to further proceeding with a plurality of "gate-like" criteria that must to some degree be satisfied so as to obtain a positive result.

As mentioned, in these and other embodiments, transmission of the preliminary data 515 to various modules 600-800 may be simultaneously, while in still other embodiments, transmission may be sequential and temporally spaced, as may be desirable or necessary for particular applications. For example, the preliminary data 515 may be first transmitted to the report module 700, for example where confirmation is desirable from one or more users of the system prior to proceeding with further activities, as would be executed by the engagement module 600 upon transmission of the preliminary data thereto. Still further, in any of these and still other embodiments, only a portion of the preliminary data 515 or merely an indication or notification thereof or the existence thereof (e.g., as in an alert) may be transmitted automatically upon generation thereof, while generation of other portions of the preliminary data may not result in any automatic transmission thereof pending further subsequent activity that operates as a trigger for transmission of data. In at least one embodiment, the entirety of any pre-established criteria must be evaluated prior to transmission of the preliminary data 515, so as to prevent premature and/or inaccurate conclusions regarding qualification.

Of course, various configurations may be envisioned, whereby, in certain embodiments, the qualification module 500 may be configured to automatically perform step 550, while in other embodiments, the module may perform such only periodically, at an interval predetermined by one or more users of the system 20, as may be desirable for particular applications. In any of these and still other embodiments, any portion of the data may be otherwise exchanged, whether automatically or upon request therefor, with or from the remaining module 600-800, as may be desirable for certain applications.

Engagement Module 600

According to various embodiments and as previously mentioned herein, the engagement module 600 is generally configured according to various embodiments to execute one or more tools (e.g., a targeting tool 610 and an engagement (i.e., engage) tool 615) so as to facilitate the customer engagement process (see steps 1002-1008 of FIG. 11).

FIG. 8 illustrates non-limiting and exemplary steps that may be executed by the engagement module 600 according to various embodiments. If preliminary data 515 is identified in step 620, the engagement module 600 proceeds to step 630; otherwise the module proceeds into a static loop via step 625 pending receipt of new data. During step 625, the engagement module 600 may be configured to passively stand by for receipt of data. In certain embodiments, the engagement module 600 may, in step 625, periodically (e.g., every 5 seconds, or at any desirable interval) proactively ping one or more databases contained within one or more of the modules 400-500, however as may be desirable. In certain embodiments, the engagement module 600 may ping or otherwise be in periodic or continuous communication with the implementation module 800 as well. Of course, various alternative data monitoring configurations may be envisioned, without departing the scope and nature of the present invention, as such are commonly known and understood in the art.

Remaining with FIG. 8, during step 630, a targeting tool 610 is executed, the result of which is the generation of targeting data 612 in step 640. According to various embodiments, the execution of the targeting tool 610 corresponds substantially to the performance of steps 1002-1004 of FIG. 11, as detailed previously herein. As a result, in certain embodiments, the generated targeting data 612 comprises at least one of the non-limiting examples of the type of customer, whether funding is tentatively approved, whether the customer is excepted or exclusive for purposes of placement on a target list, and whether the customer is interested in further pursuing the on-demand "right-size" packaging engagement process.

According to various embodiments, the determination of customer type may comprise evaluation via the targeting tool 610 of at least whether the customer is an active sales engagement (e.g., renewal, extension, or open bid) with the common carrier provider 1030 (see FIG. 11), a signed account with no current small package sales activity, or a conversion account, whereby an active sales engagement may be utilized to convert competitive volume. It should be understood that underlying each of these determinations is a desire by the common carrier provider to precisely identify an optimal manner in which the on-demand "right-size" packaging opportunity will be ultimately presented to the customer; one consideration in that regard is what type of customer account is involved. Of course, a further non-limiting example of determinations and decisions made via the internal review according to various embodiments includes determining whether the common carrier service provider 1030 will tentatively fund the on-demand "right-size" packaging machines.

As mentioned, via execution of the targeting tool 610 in step 630 and the generation of targeting data 612 in step 640 as a result thereof, a determination may be further made as to whether or not the customer is to be placed upon a target list. In certain embodiments, the determination includes at least a calculation of whether the customer is characterized as excepted or exclusive. With momentary reference to FIG. 11, if the supplier 1040 is currently engaged with the identified customer account (e.g., the two parties already have a business arrangement outside of the common carrier provider 1030), then in certain embodiments, the account is identified as "excepted" from the process, as a result of which the supplier may continue to engage the account without involvement from the common carrier provider and the process described herein and illustrated in FIG. 11 is otherwise halted. If the supplier is not previously engaged with the identified account, the account is identified according to various embodiments as "exclusive" to the process, meaning that the supplier 1040 may only further pursue the account jointly with the common carrier provider 1030. In this manner, the configuration described herein and illustrated in at least FIG. 11 provides a shared value incentive to aid grown and retention to both the common carrier provider 1030 and the supplier 1040 while also creating switching (e.g., lost business) barriers for identified, qualified, and now targeted customers.

Returning now to FIG. 8, with continued focus on the targeting data 612 generated in step 640, which has been thus far noted as potentially comprising an identification of customer type (e.g., as non-limiting examples active sales, signed account, or conversion) and an identification of account type (e.g., as non-limiting examples excepted or exclusive), it should be further understood that according to various embodiments, the generated targeting data 612 may further include a request for customer input, which may be based at least in part upon the determinations previously described herein. For example, should the customer type be an active sales engagement qualifying to be placed on the exclusive target list, a request may be generated as at least a portion of the targeting data 612, which request may be transmitted to the report tool 710 in step 645 (see FIG. 8). In response thereto, whether via an alert, report or other communication mechanism or medium (as detailed elsewhere herein), the customer may indicate whether they wish to further pursue the possible engagement with the common carrier provider and the supplier. Such transmission in step 645 of FIG. 8 corresponds in at least one embodiment substantially with the performance of at least a portion of step 1004 of FIG. 11.

Returning again to FIG. 8 and with reference now to steps 640, 645, and 650 in combination, according to various embodiments, upon generation of some portion of targeting data 612, the engagement module 600 is configured to proceed to step 650. In certain embodiments, such progression to step 650 may only occur upon transmission of at least a portion of the targeting data 612 (or at least an indication thereof) to one or more users of the system (e.g., via the report tool 710). In at least one embodiment, such progression to step 650 may further only occur upon still further receipt of a response from one or more users in view of the transmission thereto of the portion of the targeting data 612. In any event, it should be understood that in these and still other embodiments, progression to execution of an engagement tool 615 in step 650 should only occur upon satisfaction of all criteria prior to step 1005 of FIG. 11, thus including the customer prequalification meeting (or simple notification, whether electronic or otherwise), in response to which the customer expresses interest in further proceeding; otherwise, the on-demand "right-size" packaging engagement process ends, such that the engagement tool 615 is not, in such circumstances executed.

Returning with focus now on step 650 of FIG. 8, according to various embodiments, upon generation of targeting data 612 and/or receipt of at least some portion thereof (or an indication associated therewith) from the report tool 710, the engagement module is configured to execute its engagement tool 615. In certain embodiments, execution of the engagement tool 615 is further preceded by retrieval of at least some portion of data 402-404 during step 655, typically from the data module 400. Retrieval of such data is necessary in these and still other embodiments so as to inform the parameters and/or algorithms associated with the execution of the engagement tool 615 to generate data 616-618 in step 660.

It should be understood that execution of the engagement tool 615 to generate and/or maintain data 616-619 in step 660 generally corresponds in various embodiments to the performance of steps 1005-1008 of the engagement process 1000 illustrated in FIG. 11. Indeed, via performance of step 1005, the attractiveness of the customer's facilities for the on-demand "right-size" packaging configuration is evaluated. While in certain embodiments, such may involve a physical on-site visit by one or more of the common carrier provider and/or the supplier, in other embodiments, such may be performed substantially electronically via execution of the engagement tool 615. In such embodiments, the engagement tool 615 may retrieve portions of at least customer data 402 from the data module and based at least in part thereon, determine the feasibility of the customer's site for further engagement and implementation. In various embodiments, the calculation performed by the engagement tool 615 in this manner may comprise at least a determination of the percent of potential packages that could be impacted and the potential reduction in overall cube factor for those packages if implementation were to proceed. In this manner, execution of the engagement tool 615 and generation thereof of at least facility data 616 provides an indication of site feasibility that quantifies the net cube factor reduction that would result, which is an important consideration for at least the common carrier provider, to the degree such likewise influences common carrier network costs and/or expenses.

Execution of the engagement tool 615 in step 650 of FIG. 8 according to various embodiments further generates funding data 617 (see also FIG. 5), corresponding substantially to performance of step 1007 of the engagement process 1000 illustrated in FIG. 11. In certain embodiments, such funding data 617, as has been previously detailed herein, comprises at least an indication of whether funding has been now finally approved. In those embodiments involving the engagement tool 615 the analysis associated with step 1007 may thus be performed electronically and/or in an automated fashion. As a result, it should be understood that execution of the engagement tool 615 according to various embodiments may additionally comprise an assessment of whether the return on investment (ROI) warrants provision of full funding, partial funding, or no funding of the proposed implementation. Such analysis may, in certain embodiments, include at least an assessment of the value of benefits flowing to the common carrier provider. In at least one embodiment, such benefits may include a value of increased volume of package shipments and a value of a reduction in cube factor. Of course, other parameters and/or factors may be assessed, as may be desirable for particular scenarios.

Execution of the engagement tool 615 in step 650 of FIG. 8 according to various embodiments further generates strategic data 618 (see also FIG. 5), corresponding substantially to performance of steps 1006 and 1008 of the engagement process 1000 illustrated in FIG. 11. In certain embodiments, such strategic data 618, as has been previously detailed herein, comprises an identification of savings from all possible areas as a result of implementation of the on-demand "right-size" packaging configuration. Such savings on the customer side may include at least the non-limiting examples of reduced corrugate spend, reduced filler spend, inventory reductions, labor reductions, freight weight reductions, and the like. The value proposition in certain embodiments may also include a share of savings to the common carrier provider 1030 as a result of the cube factor reduction, which notably improves density of packages and thus enables the provider to more efficiently use container transport volume. Of course, additional and/or alternative parameters and/or characteristics may be considered and generated as at least a portion of the strategic data 618, as may be desirable in particular scenarios.

Execution of the engagement tool 615 in step 650 of FIG. 8 according to various embodiments further maintains and/or generates one or more customer agreements or contracts 619, as reflected in at least steps 1010-1009 of FIG. 11. In certain embodiments, such contracts 619 may be based at least in part upon pre-defined templates; in other embodiments they may be generated in their entirety, however as may be desirable for particular applications. According to these and still other embodiments, however, it should be understood that these contracts 619 are prepared, as will be described in further detail elsewhere herein based at least in part upon the analysis performed via steps 1005-1008 of FIG. 11. Such contracts 619 may be later finalized and then executed in steps 1012-1013 of FIG. 11, with final versions thereof being generated and distributed to one or more users of the system upon implementation (see step 1014 of FIG. 11 and also documents 718 of FIG. 5).

With further focus upon the engagement tool 615 momentarily, it should be understood that the generation of the data/contracts 616-619, as detailed herein may be performed in a substantially sequential manner, such as in the order described herein. However, in certain embodiments, the data/contracts 616-619 may be generated in alternative order(s) relative to one other, or even substantially simultaneously, however as may be desirable and/or feasible for certain scenarios. It should be understood, of course, that the generation of such data 616-619 will, according to various embodiments, largely correspond to performance of steps 1005-1008 of FIG. 11, as previously mentioned, and as such will be performed in substantially the same order as such steps are performed, whether sequentially or otherwise. It should also be understood that in at least the illustrated embodiments, generation of the contracts 619 corresponds substantially to steps 1009-1010 of FIG. 11.

Turning now to step 670 of FIG. 8, it may be understood that upon generation of any portion of data 616-618, as has been previously detailed herein, the engagement module 600 according to various embodiments is configured to, in this step, transmit such data to at least the report module 700. Various portions of the data 616-618 may be transmitted simultaneously in certain embodiments, while in still other embodiments transmission may be sequential and/or temporally spaced, as may be desirable or more practical for particular scenarios. For example, the facility data 616 and the funding data 617 may be transmitted to the report tool 710 only upon further generation of the strategic data 618. In alternative scenarios, at least the facility data 616 may be transmitted to one or more users of the system (e.g., via the report toll 710) substantially immediately upon generation thereof, so as to notify the one or more users of the existence thereof. In at least one embodiment, upon generation of the facility data 616 and transmission thereof to the report tool 710, the engagement tool 616 may be configured to only perform further analysis and calculations with respect to generation of funding and/or strategic data 617-618, upon receipt of further data and/or communication from the one or more users in response to receipt of the (or an indication of the) facility data 616. In this regard, it should be understood that a variety of sequential transmission of data 616-618 and discrete portions thereof may be envisioned, without departing from the scope and intent of the embodiments described herein.

Report Module 700

According to various embodiments and as previously mentioned herein, the report module 700 (see FIGS. 3 and 5) is configured to generate periodic or timely alerts 712 and/or reports 715 to one or more users of the system 20, and also to generate one or more documents 718, as necessary to complete various steps of the on-demand "right-size" packaging engagement process (see at least steps 1001, 1004, 1008, and 1009-1011 of FIG. 11).

FIG. 9 illustrates non-limiting and exemplary steps that may be executed by the report module 700 according to various embodiments, whereby if "newly received" data is identified in step 720, the report module 700 proceeds to step 730; otherwise the module proceeds into a static loop via step 725 pending receipt of new data. During step 725, the report module 700 may be configured to passively stand by for receipt of data. In certain embodiments, the report module 700 may, in step 725, periodically (e.g., every 5 seconds, or at any desirable interval) proactively ping one or more databases contained within one or more of the modules 400-600, however as may be desirable. In certain embodiments, the report module 700 may ping or otherwise be in periodic or continuous communication with the implementation module 800 as well. Of course, various alternative data monitoring configurations may be envisioned, without departing the scope and nature of the present invention, as such are commonly known and understood in the art.

Remaining with FIG. 9, during step 730, the report module 700 is configured to execute a report tool 710, which is generally configured to at least initially determine, in step 735, the type of data that has been received. If preliminary data 515 is identified as having been received, such is determined via step 740; if targeting data 612 is identified as having been received, such is determined via step 750; if any of data 616-618 or instruction(s) 815 is identified as having been received, such is determined via step 760. Subsequent processing by the report tool 710 in each scenario is described, in turn, below.

Upon identification of receipt of preliminary data 515, the report tool 710 is configured according to various embodiments to proceed to step 745, during which one or more alerts 712 and/or reports 715 are generated. For example, upon generation (by the qualification module 400) and receipt (by the report module 700) of the preliminary data 515, an alert 712 and/or a report 715 thereof may be generated and subsequently (which may include in a near real-time fashion or otherwise) transmitted in step 780 to one or more users of the system 20. Via the report tool 710, the alert 712 and/or report 715 may be transmitted thus at least to the common carrier provider, who may, in return, acknowledge the same with at least a confirmation of intent to further pursue the engagement process (see FIG. 11). With continued reference to FIG. 11, it should be understood that, as a non-limiting example, the generated preliminary data 515 and the notification of the existence thereof to at least the common carrier provider (and possibly one or more additional or alternative users of the system 20 described herein) corresponds substantially to the completion of step 1001 and the initiation of step 1002 as illustrated in FIG. 11. In this manner, at least a portion of the activities associated with steps 1001-1002 are automated and/or at least electronically conducted via a combination of execution of the qualification tool 510 and the report tool 710. In such a scenario, the various alerts and/or reports may also be transmitted to at least the supplier, whether indicative of the preliminary data 515 or further indicative of the common carrier's response thereto. Indeed, a variety of additional and/or alternative report and/or alert configurations may be envisioned, as should be considered within the scope and nature of the disclosed embodiments.

Upon identification of receipt of targeting data 612, the report tool 710 is configured according to various embodiments to proceed to step 755, during which one or more alerts 712 and/or reports 715 are generated, in much the manner as described herein-above. With reference momentarily to FIG. 11, the generation of the alerts 712 and/or reports 715 in step 745 may correspond substantially with step 1004, wherein a prequalification determination is conducted by at least the common carrier provider 1030 and the customer 1020, and whereby the customer reports their interest in further pursuing the possibility of converting to an on-demand "right-size" packaging configuration. Thus, via the report tool 710, the alert 712 and/or report 715 may be transmitted thus at least to the customer, who may, in return, acknowledge the same with at least an indication of intent to further pursue the engagement (e.g., conversion) process or of intent to not further pursue. In this manner, at least a portion of the activities associated with step 1004 of FIG. 11 may be substantially automated and/or performed electronically as between the system 20 and the customer. In such a scenario, the various alerts and/or reports may also be transmitted to at least the common carrier, whether indicative of the targeting data 612 or further indicative of the customer's response thereto. Indeed, a variety of additional and/or alternative report and/or alert configurations may be envisioned, as should be considered within the scope and nature of the disclosed embodiments.

Upon identification of receipt of any sort of data 616-618 or 815, the report tool 710 is configured according to various embodiments to proceed to step 765, during which engagement data 405 is retrieved from the data module 400. As previously detailed herein, the engagement data 405 may comprise non-limiting examples of parameters and information associated with the PELSA, CODPP, and consolidated customer agreement documents, as detailed with respect to steps 1009-1012 of FIG. 11 and elsewhere herein. The engagement data 405 may further comprise one or more pre-established terms or parameters, as between the common carrier service provider and the supplier, as may have been previously agreed upon so as to further facilitate and expedite the engagement and/or negotiation process with new customers.

In the context of step 765, upon retrieval of at least a portion of the engagement data 405, the report tool 710 may be configured according to various embodiments to proceed to step 770 wherein one or more documents 718 are generated. In certain embodiments, the documents 718 may comprise at least the PELSA, CODPP, and the consolidated customer agreement documents, although in other embodiments additional and/or alternative documents may be generated. As may be understood further from FIG. 9, upon generation of the documents 718, the process may proceed alternatively (or concurrently) to steps 775 and 790. In step 775, one or more alerts 712 and/or reports 715 may be generated, as may include the documents 718, be indicative thereof, or contain information advising one or more users of the generation and existence thereof, however as may be desirable. Step 775 may then proceed to step 780, as previously described herein, wherein the one or more alerts 712, reports 715, and in this instance possibly documents 718 may be further transmitted to one or more users of the system.

Remaining with FIG. 9 and with reference further to step 790, according to various embodiments, the document(s) 718 may be concurrently or otherwise transmitted to at least the implementation module 800 and/or to one or more users of the system 20. Where transmitted to the implementation module 800, such may be indicative of completion of at least steps 1009-1011 of the process 1000 depicted in FIG. 11, as detailed elsewhere herein. In these and still other embodiments, transmission to one or more users of the system may likewise be indicative of completion of at least steps 1009-1011, although such may be additionally and/or alternatively indicative of a mere notification to the user of the existence of one or more documents.

With reference further to FIG. 9 and returning momentarily to step 760, it should be understood that in some instances the data received may comprise instructions 815, as may have been previously generated via the implementation module 800, as detailed elsewhere herein. In this instance, generated documents are transmitted (in steps 775 and/or 790) to at least one or more users of the system, so as to facilitate actual implementation of the finalized on-demand "right-size" packaging engagement (see also steps 1012-1014 of FIG. 11). In at least one embodiment, the instructions may comprise computer-generated code configured to be utilized further by the system (or by other systems in contact with the one or more users of the system 20) to facilitate actual implementation. According to various embodiments, one or more notifications (e.g., alerts 712) may be likewise transmitted to one or more users of the system, so as to provide an indication of the existence of the generated instructions and facilitate further action.

Indeed, a variety of alternatives reporting, alerting, and otherwise transmission of data may be envisioned, as may be performed via the report tool 710 according to various embodiments. In this regard, as a non-limiting example, it should be understood that while the alerts 712 and reports 714 and documents 718 described herein may be transmitted periodically and with differing timetables respective to one another, the basis of both generating and transmitting the same may also further differ. For example, alerts may be reserved for actions for which user (or third party entity) approval is necessary for further action, for example, where approval is necessary to implement mitigation actions, whether due to the cost incurred thereby or for alternative reasons. Reports may be simply informative, requiring no further positive action or interaction from the recipient thereof with the system 20. In such embodiments, reports, both with respect to content and the frequency thereof, may be established and even pre-established by any of the variety of users of the system, including non-users of the system to which notification or reporting may be mandated by various regulations or user preferences. The formatting of such reports and/or alerts may also be customized, as may be desired for particular users of the system. Instructions may be similarly formatted, depending upon desirable parameters therefor. Indeed, additional and/or alternative formats of reporting and/or communication may be envisioned without departing from the scope and intent of the present invention, and any of those, like those described previously herein, may be implemented in a manual or automatic fashion, electronically or otherwise, however as may be desirable.

Implementation Module 800

According to various embodiments and as previously mentioned herein, the implementation module 800 (see FIGS. 3 and 5) is configured to facilitate one or more tangible or physical activities designed to actually implement the realization of the engagement process described herein, upon completion thereof. For example, the implementation module 800 may be configured in certain embodiments to facilitate placement of one or more "right-size" packaging machines on site at the customer's facility, upon signature of the agreement therefor, as between the various users of the system 20. As another non-limiting example, the implementation module 800 may be configured to generate instructions, which may comprise at least in part computer generated code configured to instruct one or more entities or external systems to perform one or more actions (e.g., fabricate the necessary machines, ship the necessary machines, delivery the necessary machines, and the like). In these and still other embodiments, it should be understood that the execution of the implementation module 800 corresponds substantially to performance of at least steps 1012-1014 of the process 1000 illustrated in FIG. 11.

FIG. 10 illustrates non-limiting and exemplary steps that may be executed by the implementation module 800 according to various embodiments, whereby if "newly received" documents 718 are identified in step 820, the report module 700 proceeds to step 830; otherwise the module proceeds into a static loop via step 825 pending receipt of new documents. During step 825, the implementation module 800 may be configured to passively stand by for receipt of documents. In certain embodiments, the implementation module 800 may, in step 825, periodically (e.g., every 5 seconds, or at any desirable interval) proactively ping at least the report module 700, however as may be desirable. Of course, various alternative data monitoring configurations may be envisioned, without departing the scope and nature of the present invention, as such are commonly known and understood in the art.

Remaining with FIG. 10, during step 830, the implementation module 800 is configured to execute an implementation tool 810, which is generally configured to, in step 840, generate one or more instructions 815. According to various embodiments, the one or more instructions 815 are configured to facilitate implementation of the on-demand "right-size" engagement agreed to between the various users of the system (e.g., at least the customer, supplier, and common carrier provider). In certain embodiments, the instructions 815 may comprise computer generated code configured to instruct activities necessary to facilitate implementation of the agreed upon engagement. In other embodiments, the instructions 815 may be textual or human-readable materials, as may be provided via the system (e.g., the report tool 710) to one or more users of the system, whether as alerts, reports, or otherwise. Such transmission may occur in step 850, as also illustrated in FIG. 10.

With further reference to FIG. 10, it should be understood that according to various embodiments, during execution of the implementation tool 810 in step 830, the implementation module 800 may be configured to further retrieve at least a portion of implementation data 406 from the data module 400, however as may be necessary or desirable, all as illustrated in step 835. As a non-limiting example, the implementation data may comprise one or more parameters, whether substantively or otherwise related, required for and associated with the implementation of an on-demand "right-size" packaging production configuration upon execution of the agreement documents by the one or more users (e.g., customer, carrier, and supplier) of the system. Such may be textually based parameters, for formatting a textual or otherwise human-readable document that will constitute the instructions 815 generated in step 840. In other embodiments, however, the parameters may be computer-readable only, configured to generate computer-code based instructions 815, as may be desirable in certain scenarios.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising: one or more memory storage areas containing at least one or more parameters, customer data associated with at least one customer, carrier data associated with at least one carrier, and supplier data associated with at least one supplier; and
   one or more computer processors configured to:
   receive qualification data associated with the at least one customer;
   calculate, based at least in part upon the qualification data, the one or more parameters, and the customer data, whether the at least one customer is a qualified customer;
   in response to calculating that the at least one customer is a qualified customer, determine, based at least in part upon the carrier data and the supplier data, whether the qualified customer is a targeted customer;
   based at least in part on the determining that the qualified customer is a targeted customer, generate one or more documents for execution by at least the targeted customer, the at least one carrier, and the at least one supplier; and
   based at least in part on the execution of the one or more documents, instruct, at least in part via computer-generated code, a system to fabricate one or more right-size packaging machines.

2. The system of claim 1, wherein the one or more processors are further configured to: cause placement of the one or more right-size packaging machines at at least one facility based on the execution of the one or more documents.

3. The system of claim 1, wherein the one or more processors are further configured to: instruct a system to deliver the one or more right-size packaging machines to at least one facility based on the execution of the one or more documents.

4. The system of claim 1, wherein the one or more parameters comprise whether a sampled cube factor for the at least one customer is greater than a cube factor threshold.

5. The system of claim 4, wherein the cube factor threshold is at least 1.10.

6. The system of claim 4, wherein the sampled cube factor is calculated based at least in part upon a ratio of a calculated weight for a package having particular dimensions to an actual weight for the package.

7. The system of claim 1, wherein the qualification data includes: customer shipping volume data over time, customer package filler percentage data over time, item consistency data for shipments containing multiple over-packed items, customer received complaint data, customer green or environmental policy or initiative data, fulfillment data, package density data, customer account type data, and package cube factor data over time.

8. The system of claim 1, wherein the carrier data includes at least one from a group consisting of: carrier account data, customers and third parties with which the at least one carrier is actively engaged, carrier strategic considerations and assessments.

9. A computer-implemented method comprising: receiving and storing within one or more memory storage areas at least one or more parameters, customer data and qualification data associated with at least one customer corresponding to at least one consignor, carrier data associated with at least one carrier, and supplier data associated with at least one supplier that supplies package material;
   calculating, via at least one computer processor and based at least in part upon the qualification data, the one or more parameters, and the customer data, whether the at least one customer is a qualified consignor;
   in response to identifying the qualified consignor, determining, via the at least one computer processor and based at least in part upon the carrier data and the supplier data, whether the qualified consignor is a targeted consignor;
   based at least in part on the qualified consignor being a targeted consignor, generating, via the at least one computer processor, one or more documents for execution by at least the targeted consignor, the at least one carrier, and the at least one supplier; and
   based at least in part on execution of the one or more documents, instruct, at least in part via computer-generated code, a system to fabricate one or more right-size packaging machines.

10. The method of claim 9, further comprising facilitating placement of the one or more right-size packaging machines at at least one facility based on the execution of the one or more documents.

11. The method of claim 9, further comprising instructing a system to deliver the one or more right-size packaging machines to at least one facility based on the execution of the one or more documents.

12. The method of claim 9, wherein the one or more parameters comprise whether a sampled cube factor for the at least one customer is greater than a cube factor threshold.

13. The method of claim 12, wherein the cube factor threshold is at least 1.10.

14. The method of claim 12, wherein the sampled cube factor is calculated based at least in part upon a ratio of a calculated weight for a package having particular dimensions to an actual weight for the package.

15. The method of claim 9, wherein the qualification data includes at least one of a group consisting of: customer shipping volume data over time, customer package filler percentage data over time, item consistency data for shipments containing multiple over-packed items, customer received complaint data, customer green or environmental policy or initiative data, fulfillment data, package density data, customer account type data, and package cube factor data over time.

16. The method of claim 9, further comprising: evaluating a readiness of at least one facility, wherein the evaluation of the readiness comprises a calculation of at least a percent of potential packages impacted by implementation of an on-demand packaging configuration and a reduction value of a cube factor for the potential packages.

17. A non-transitory computer program product comprising at least one computer-readable storage medium having computer-readable program code portions embodied therein that are executable by one or more processors of an on-demand package engagement server, the computer-readable program code portions comprising:
- an executable portion configured for receiving, over a computer network and by the on-demand package engagement server, qualification data associated with at least one customer, the qualification data corresponds to data that indicates whether the at least one customer satisfies criteria to qualify for engagement in an on-demand packaging configuration;
- an executable portion configured for retrieving, by the on-demand package engagement server, at least one or more parameters and based at least in part thereon and further upon the qualification data and additional customer data, calculating whether the at least one customer is a qualified customer;
- an executable portion configured for in response to identifying the qualified customer, determining by the on-demand package engagement server, based at least in part upon carrier data and supplier data, whether the qualified customer is a targeted customer;
- an executable portion configured for, generating, via an engagement tool and by the on-demand package engagement server, one or more electronic documents for electronic execution by at least the targeted customer, a carrier, and a supplier;
- an executable portion configured for, based at least in part on the execution of the one or more electronic documents, instructing, by the on-demand package engagement server, a system to fabricate one or more right-size packaging machines.

18. The computer program product of claim 17, wherein the one or more parameters include computer-readable parameters that generate computer-code based instructions that are configured to facilitate implementation of a right-size packaging production configuration.

* * * * *